(12) United States Patent
Sekiguchi et al.

(10) Patent No.: US 9,920,812 B2
(45) Date of Patent: Mar. 20, 2018

(54) VIBRATION DAMPER

(71) Applicant: TOYOTA JIDOSHA KABUSHIKI KAISHA, Toyota-shi (JP)

(72) Inventors: Tadashi Sekiguchi, Toyota (JP); Naoyuki Kishimoto, Toyota (JP); Fusahiro Tsukano, Toyota (JP); Atsushi Honda, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/316,659

(22) PCT Filed: Jun. 9, 2015

(86) PCT No.: PCT/JP2015/066613
§ 371 (c)(1),
(2) Date: Dec. 6, 2016

(87) PCT Pub. No.: WO2015/190486
PCT Pub. Date: Dec. 17, 2015

(65) Prior Publication Data
US 2017/0184177 A1 Jun. 29, 2017

(30) Foreign Application Priority Data
Jun. 10, 2014 (JP) .................................. 2014-119294

(51) Int. Cl.
*F16F 15/12* (2006.01)
*F16H 1/28* (2006.01)

(52) U.S. Cl.
CPC ........... *F16F 15/1206* (2013.01); *F16H 1/28* (2013.01)

(58) Field of Classification Search
CPC .................................................. F16F 15/1206
See application file for complete search history.

(56) References Cited

U.S. PATENT DOCUMENTS 5,551,928 A * 9/1996 Sudau ................. F16F 15/1206
192/70.17
5,863,274 A 1/1999 Jackel
(Continued)

FOREIGN PATENT DOCUMENTS

| JP | 9-196122 S | 7/1997 |
|---|---|---|
| JP | 2010-1905 A | 1/2010 |
| JP | 2012-225482 A | 11/2012 |

OTHER PUBLICATIONS

International Search Report dated Jul. 7, 2015 in PCT/JP2015/066613 filed Jun. 9, 2015.

*Primary Examiner* — Derek D Knight
(74) *Attorney, Agent, or Firm* — Oblon, McClelland, Maier & Neustadt, L.L.P.

(57) ABSTRACT

To prevent response delay and to damp torsional vibration transmitted to a power transmission route. A vibration damper includes a first route R1 provided with a coil spring 43 as an elastic member, and a second route R2 provided with a sun gear 5s as an inertial body formed to be parallel as power transmission routes between an engine 10 to a transmission 20, and by switching the first route R1 and the second route R2 by a first clutch C1 and a second clutch C2, switchover to a state in which an inertial torque acts on the power transmission route by the sun gear 5s and a state in which the inertial torque is not generated is carried out.

12 Claims, 30 Drawing Sheets

(56) References Cited

U.S. PATENT DOCUMENTS

| | | | |
|---|---|---|---|
| 2013/0014609 A1* | 1/2013 | Tsukano | F16F 15/1457 |
| | | | 74/574.2 |
| 2016/0129910 A1* | 5/2016 | Amano | B60W 30/1882 |
| | | | 701/54 |
| 2016/0281830 A1* | 9/2016 | Sekiguchi | F16H 45/02 |

* cited by examiner

|  | C1 | C2 | K | I |
|---|---|---|---|---|
| R1 | ○ | × | ON | ON |
| R2 | × | ○ | OFF | OFF |

○ : Engaged
× : Disengaged
ON : Activated
OFF : Inactivated

□ : Activated
○ : Inactivated (a)

(b)

(a)

(b)

(a)

(b)

VIBRATION DAMPER

TECHNICAL FIELD

This invention relates to a vibration damper which reduces torsional vibrations.

BACKGROUND ART

Vibration dampers having an arrangement mentioned above have been disclosed in Japanese Patent Application Laid-Open Publication No. 2012-225482, Japanese Patent Application Laid-open Publication No. 2010-001905, and Japanese Patent Application Laid-open Publication No. Hei 9-196122. In Japanese Patent Laid-open Publication No. 2012-225482 for instance, a vibration damper which includes a shock-absorbing member for absorbing torsional vibrations, and an inertial body that generates an inertial torque acting on a power transmission route has been described. In this vibration damper, the inertial body is connected to a sun gear of a planetary gear mechanism via a centrifugal clutch. In Japanese Patent Application Laid-open Publication No. 2010-001905, a vibration damper which includes a planetary gear mechanism having a sun gear that rotates integrally with an inertial body, a carrier that rotates integrally with an input shaft of a transmission, and a ring gear that is fixed selectively by a brake unit, has been described. In this vibration damper, the carrier of the planetary gear mechanism is connected to an engine via a damper that absorbs a fluctuation in torque. Moreover, in Japanese Patent Application Laid-open Publication No. Hei 9-196122, making a carrier of a planetary gear mechanism function as an inertial body has been disclosed.

However, in the vibration damper described in each of the abovementioned patent literature, it is possible to damp the torsional vibrations by making a damping force by the shock-absorbing member and the inertial body act on the power transmission route, but a response of a vehicle is degraded due to the damping force.

SUMMARY OF THE INVENTION

This invention has been made in view of the abovementioned circumstances, and an object of the present invention is to provide a vibration damper which prevents response delay of a vehicle, and damps the torsional vibrations transmitted to the power transmission route.

The present application relates to a vibration damper which includes a damper mechanism having an elastic member that is expanded and compressed by a pulsation of a torque transmitted between an input shaft to which the torque is inputted and an output shaft, and an inertial body that is allowed to be rotated freely by the pulsation of the torque and that generates an inertial torque in a direction of suppressing the pulsation of torque when a rotational speed is changed. In order to achieve the abovementioned object, according to the present application, the vibration damper is provided with: a first route which transmits the torque between the input shaft and the output shaft via the damper mechanism; a second route which transmits the torque between the input shaft and the output shaft while bypassing the damper mechanism; and a switching mechanism which switches a torque transmission route between the input shaft and the output shaft to any one of the first route and the second route. Specifically, the switching mechanism allows the inertial body to rotate freely in a case that the torque transmitting route between the input shaft and the output shaft is switched to the first route, and connects the inertial member to a member to which a torque is applied in a case that the torque transmitting route between the input shaft and the output shaft is switched to the second route so as to transmit the torque through the second route.

According to the present application, the vibration damper may further comprises a planetary mechanism adapted to perform a differential action among a plurality of rotary elements. Specifically, the planetary mechanism comprises a first rotary element to which the torque is transmitted from the input shaft, a second rotary element which is rotated integrally with the output shaft, and a third rotary element which serves as the inertial body. In this case, the damper mechanism may be disposed between the first rotary element and the second rotary element to transmit the torque therebetween. In addition, the switching mechanism may comprise a first clutch mechanism which is disposed in series with respect to the damper mechanism between the first rotary element and the second rotary element, and a second clutch mechanism which connects the third rotary element to one of the first rotary element and the second rotary element.

As described, the vibration damper according to the present application may further comprises a planetary mechanism adapted to perform a differential action among a plurality of rotary elements, and the planetary mechanism may comprise a first rotary element to which the torque is transmitted from the input shaft, a second rotary element which rotates integrally with the output shaft, and a third rotary element which serves as the inertial body. According to another aspect of the present application, the member to which the torque is applied may include a fixed portion to which the torque is applied from the third rotary element to exert a reaction torque to the third rotary element. As also described, the switching mechanism may comprise a first clutch mechanism which is disposed in series with respect to the damper mechanism between the first rotary element and the second rotary element, and a second clutch mechanism which connects the third rotary element to one of the first rotary element and the second rotary element.

According to the present application, the vibration damper may further comprise: a spring damper mechanism which is disposed between the engine and the input shaft, or on the output shaft; and a controller which carries out a switching operation of the switching mechanism. Specifically, the controller may be configured to compare the speed of the engine with a predetermined criterion speed, and switch the switching mechanism to transmit the torque from the input shaft to the output shaft through the first route in a case that the speed of the engine is lower than the predetermined speed.

According to the present application, the controller may be further configured to switch the switching mechanism to transmit the torque from the input shaft to the output shaft through the second route in a case that the speed of the engine is equal to or higher than the predetermined speed.

As described, the vibration damper according to the present application may further comprises: the spring damper mechanism which is disposed between the engine and the input shaft or on the output shaft; and the controller which carries out a switching operation of the switching mechanism. The controller may also be configured to compare the speed of the engine with a predetermined criterion speed, and switch the switching mechanism to transmit the torque from the input shaft to the output shaft through the second route in a case that the speed of the engine is equal to or higher than the predetermined speed.

According to this invention, when the torque transmitting route between the input shaft and the output shaft is switched to the first route by the switching mechanism, since the torque is transmitted through the damper mechanism, as the pulsation in torque is generated, the pulsation in torque is reduced by the damper mechanism, and moreover, an acceleration acts on the inertial body thereby the inertial body generating the inertial torque, and the inertial torque generated acts to suppress the fluctuation in torque. By the action of the damper mechanism and the action of the inertial body, the pulsation in torque of the output shaft is suppressed. In other words, it is possible to reduce the vibration effectively. Moreover, when the torque transmitting route between the input shaft and the output shaft is switched to the second route by the switching mechanism, since the torque is transmitted without passing through the damper mechanism, and the inertial body is restricted to be rotated freely, the torque of the input shaft is transmitted to the output shaft without being absorbed in the course of being transmitted. In other words, a change in the torque of the output shaft is not delayed with respect to a change in the torque in the input shaft. Consequently, in a vehicle, a response to a change in a driving force with respect to an acceleration operation becomes favorable.

Moreover, when an arrangement is made such that any one of the rotary elements in the planetary mechanism functions as the inertial body, it is possible to let the vibration damper to be a vibration damper also equipped with a function as a transmission. Particularly, when an arrangement is made such that the third rotary element which functions as the inertial body is connected selectively to either the first rotary element or the second rotary element by the first clutch mechanism, it is possible to set a speed ratio of the transmission to '1'. Moreover, when an arrangement is made such that the third rotary element which functions as the inertial body is connected selectively to the fixed portion by the second clutch mechanism, it is possible to set a speed ratio of the transmission larger than '1' or smaller than '1'.

In a case in which, the vibration damper further includes the spring damper mechanism, by switching the torque transmitting route according to the speed of the engine, it is possible to achieve a damping effect by the inertial body and the damper mechanism made to function effectively in a low speed range, and, it is possible to achieve the damping effect by the spring damper mechanism in a high speed range. Thus, it is possible to damp the vibrations effectively throughout the engine speed range.

BRIEF DESCRIPTION OF THE DRAWINGS

FIG. 1(a) is a schematic diagram when a power transmission route is set to a first route, and FIG. 1b is a schematic diagram when the route is set to a second route.

FIG. 6a is a schematic diagram when the power transmission route is set to the first route, and FIG. 6b is a schematic diagram when the power transmission route is set to the second route.

FIG. 8a is a schematic diagram when the power transmission route is set to the first route and FIG. 8b is a schematic diagram when the power transmission route is set to the second route.

FIG. 9a is a schematic diagram when the power transmission route is set to the first route, and FIG. 9b is a schematic diagram when the power transmission route is set to the second route.

FIG. 10a is a schematic diagram when the power transmission route is set to the first route and FIG. 10b is a schematic diagram when the power transmission route is set to the second route.

FIG. 12a is a schematic diagram when the power transmission route is set to the first route, and FIG. 12b is a schematic diagram when the power transmission route is set to the second route.

FIG. 13a is a schematic diagram when the power transmission route is set to the first route and FIG. 13b is a schematic diagram when the power transmission route is set to the second route.

FIG. 15a is a schematic diagram when the power transmission route is set to the first route, and FIG. 15b is a schematic diagram when the power transmission route is set to the second route.

FIG. 16a is a schematic diagram when the power transmission route is set to the first route, and FIG. 16b is a schematic diagram when the power transmission route is set to the second route.

FIG. 18a is a schematic diagram when the power transmission route is set to the first route, and FIG. 18b is a schematic diagram when the power transmission route is set to the second route.

FIG. 20a is a schematic diagram when the power transmission route is set to the first route, and FIG. 20b is a schematic diagram when the power transmission route is set to the second route.

FIG. 21a is a schematic diagram when the power transmission route is set to the first route, and FIG. 21b is a schematic diagram when the power transmission route is set to the second route.

FIG. 23a is a schematic diagram when the power transmission route is set to the first route, and FIG. 23b is a schematic diagram when the power transmission route is set to the second route.

FIG. 24a is a schematic diagram when the power transmission route is set to the first route, and FIG. 24b is a schematic diagram when the power transmission route is set to the second route.

FIG. 26a is a schematic diagram when the power transmission route is set to the first route, and FIG. 26b is a schematic diagram when the power transmission route is set to the second route.

FIG. 27a is a schematic diagram when the power transmission route is set to the first route, and FIG. 27b is a schematic diagram when the power transmission route is set to the second route.

FIG. 29a is a schematic diagram when the power transmission route is set to the first route, and FIG. 29b is a schematic diagram when the power transmission route is set to the second route.

FIG. 31a is a schematic diagram showing an arrangement in which a power transmission route is formed between an engine and a transmission via an elastic member all the time, and FIG. 31b is an illustration diagram showing a vibration damping effect exerted to the power transmission route by the elastic member in the conventional arrangement in FIG. 31a.

DETAILED DESCRIPTION OF THE PREFERRED EMBODIMENT(S)

Preferred embodiments of the vibration damper according to the present application will now be described with reference to the accompanying drawings.

1. First Example

Figure 1:
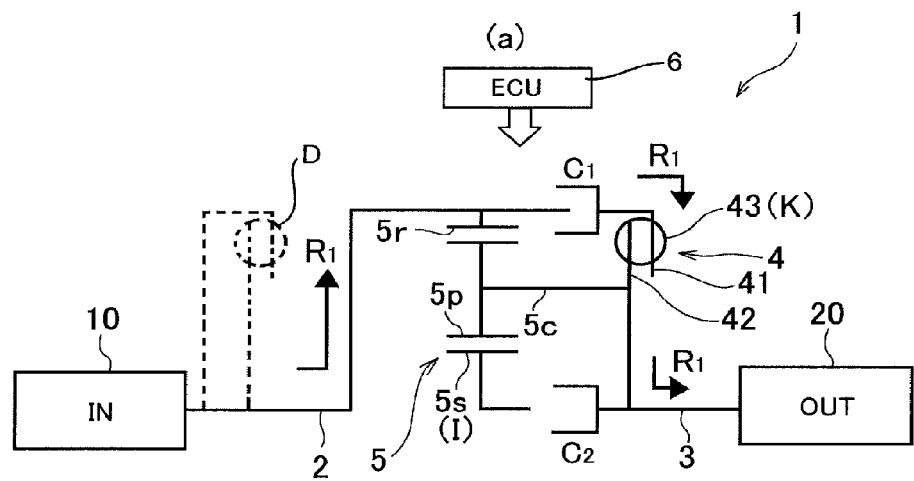
FIG. 1 shows a vibration damper according to a first example, where.
Figure 1:
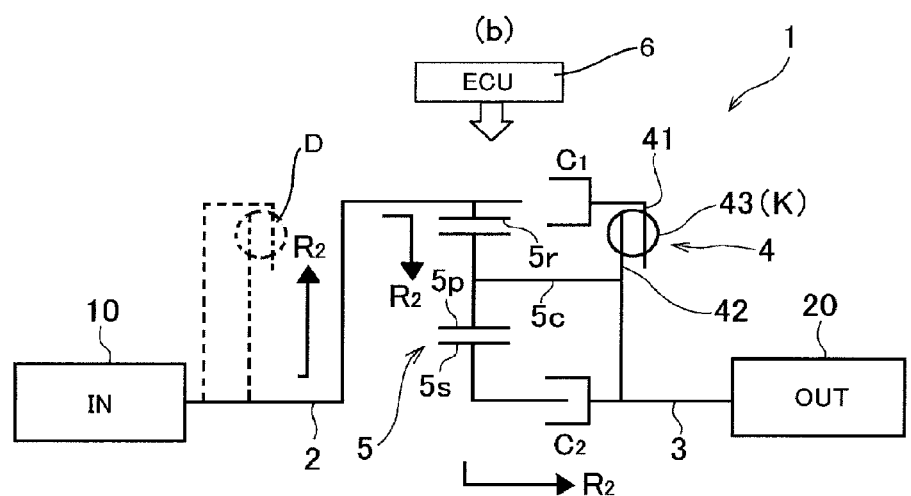

A vibration damper according to a first example of this invention will be described below by referring to FIG. 1. FIG. 1 shows a specific example in which the vibration damper according to the first example is mounted on a vehicle. As shown in FIG. 1, in the first example, an arrangement is made such that a power outputted from an engine 10 is transmitted to a transmission 20 via a vibration damper 1. The engine 10 is a prime mover of the vehicle and is a widely known internal combustion engine that uses a fuel. For instance, the engine 10 includes comparatively lesser number of cylinders such as two cylinders, three cylinders, or four cylinders. The transmission 20 includes a widely known transaxle such as a transmission gear mechanism accommodated inside a case. The transmission 20 shifts the power from the engine 10 and transmits to a drive wheel via a differential and an axle (none of the three shown in the diagram). In the first example, for reducing torsional vibrations transmitted from the engine 10 to the transmission 20, the vibration damper 1 is arranged on a power transmission route between the engine 10 and the transmission 20. In the power transmission mute, the vibration damper 1 is connected to an input shaft 2 on an engine 10 side and an output shaft 3 on a transmission 20 side. The input shaft 2 is arranged such that a torque from a crank shaft (not shown in the diagram) of the engine 10 is transmitted thereto. The output shaft 3 is arranged to rotate integrally with the input shaft (not shown in the diagram) of the transmission 20. The input shaft 2 and the output shaft 3 are disposed such that central axes of rotation thereof are collinear.

The vibration damper 1 includes a damper mechanism 4 having a coil spring 43 as an elastic member K which absorbs the torsional vibrations, and an inertia mechanism which includes a planetary mechanism 5 having a rotary element serving as an inertial body I by the torsional vibrations being absorbed by the coil spring 43 of the damper mechanism 4. Damping characteristics of the elastic member K and damping characteristics of the inertial body I differ from each other.

The damper mechanism 4 includes an input element 41 and an output element 42 that rotate relatively with respect to each other, and the input element 41 and the output element 42 are connected via the coil spring 43. The coil spring 43 absorbs the torsional vibrations by undergoing elastic deformation (contraction and elongation) in a direction of rotation. Moreover; when the damper mechanism 4 absorbs the torsional vibrations, the output element 42 rotates relatively with respect to the input element 41 by the coil spring 43 undergoing elastic deformation (contraction and elongation) in the direction of rotation.

The planetary mechanism 5 includes a differential mechanism having a plurality of rotary elements that have a differential action mutually, and may be a planetary gear mechanism or a planetary roller mechanism and the like.

The planetary mechanism 5 of the first example is formed as a single-pinion planetary gear mechanism which includes three rotary elements namely a sun gear 5, a carrier 5c, and a ring gear 5r. The sun gear 5s is formed by an external gear. The ring gear 5r is formed by an internal gear; and is disposed to be concentrically with respect to the sun gear 5s. The carrier 5c holds a pinion gear 5p which is meshed with the sun gear 5s and the ring gear 5r. In the planetary mechanism 5, the pinion gear 5p is held rotatably and revolvably by the carrier 5c. Each rotary element of the planetary mechanism 5 is disposed such that a central axis of rotation thereof is collinear with the central axis of rotation of the input shaft 2 and the output shaft 3.

In the inertia mechanism of the first example, the sun gear 5s (third rotary element) of the planetary mechanism 5 is made to function as the inertial body I. Moreover, the ring gear 5r (first rotary element) rotates integrally with the input shaft 2, and the carrier 5c (second rotary element) rotates integrally with the output shaft 3.

2. Switching Mechanism

As shown in FIG. 1, as power transmission routes from the engine 10 to the transmission 22, a first route R1 provided with the coil spring 43 of the damper mechanism 4 and a second route R2 provided with the planetary mechanism 5 are formed in parallel. Consequently, the vibration damper 1 includes a switching mechanism C which selectively switches the power transmission route to either the first route R1 or the second route R2, and makes a damping force (inertial torque) by the sun gear 5s or in other words, the inertial body I of the planetary mechanism 5 be acted selectively on the power transmission route.

The switching mechanism C includes a first switching mechanism (hereinafter, referred to as 'the first clutch') C1 and a second switching mechanism (hereinafter, referred to as 'the second clutch') C2 made of a clutch mechanism having engagement elements that are friction-engaged mutually. Moreover, the switching mechanism C, as shown in an engagement chart in FIG. 2, sets the power transmission route to either the first route R1 or the second route R2.

The first clutch C1 connects the damper mechanism 4 selectively to the input shaft 2. In the first clutch C1, the engagement element on an input side rotates integrally with the input shaft 2 and the ring gear 5r, and the engagement element on an output side rotates integrally with the damper mechanism 4 and the input element 41. Moreover, the second clutch C2 connects the sun gear 5s selectively to the output shaft 3. In the second clutch C2, the engagement element on an input side rotates integrally with the sun gear 5s, and the engagement element on an output side rotates integrally with the carrier 5c and the output element 42 of the damper mechanism 4. In other words, the damper mechanism 4 is disposed between two rotary elements (specifically, the ring gear 5r and the carrier 5c) in the planetary mechanism 5, and the first clutch C1 is disposed in series with the damper mechanism 4. Moreover; the second clutch C2 connects the third rotary element (specifically, the sun gear 5s) in the planetary mechanism 5 to either the output shaft 3 or the carrier 5c which is a member to which the torque is applied in a case of transmitting the torque to the output shaft 3.

The input side refers to the engine 10 side relatively in the power transmission route. The output side refers to the transmission 20 side (drive wheel side) relatively in the power transmission route. In other words, the input side and the output side indicate an upstream side and a downstream side of the power transmission route.

Moreover, each of the clutches C1 and C2 is operated by an actuator not shown in the diagram. The actuator is of a hydraulic type, an electromagnetic type, and the like, and an operation thereof is controlled by an electronic control unit (hereinafter, referred to as the ECU) 6.

The ECU 6 is formed of a microcomputer as a main component, and includes components such as a storage unit and an interface. The ECU 6 carries out various computing by using data that has been input and data that has been stored in advance in the storage unit, and outputs result of computing as a control signal. A vehicle speed, an accelerator opening, the speed of the engine 10 (hereinafter, referred to as 'the engine speed') Ne are to be inputted to the ECU 6. The engine speed Ne corresponds to the speed of the input shaft 2. Moreover, data for controlling the switching operation by the switching mechanism C has been stored in a map format in advance in the storage unit of the ECU 6. The control signals to be outputted by the ECU 6 include a signal to be outputted to the actuator of the switching mechanism C. Consequently, the ECU 6 controls the operation of the switching mechanism C in accordance with a running condition of a vehicle.

In a case of switching the power transmission route from the engine 10 to the output shaft 3 between the first route R1 and the second route R2 by the switching mechanism C, a switching to a case in which the damping force (damping torque, inertial torque) is made to act on the power transmission route by the sun gear 5s and a case in which the damping force is not made to act on the power transmission route by the sun gear 5s is to be carried out simultaneously.

2-1. First Route

Figures 2, 3:
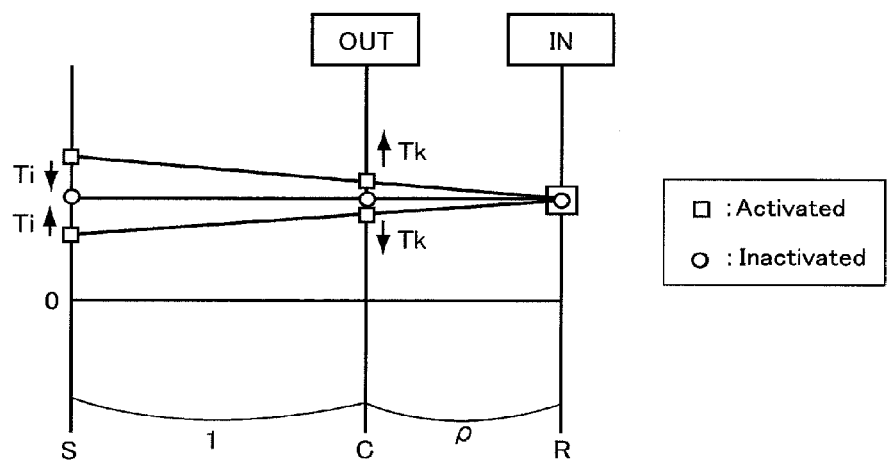
FIG. 2 is an engagement table for a switching mechanism in a case of setting the first route or the second route.
FIG. 3 is a nomographic diagram showing an operating condition of a planetary gear unit that functions as an inertia mechanism when the power transmission route is set to the first route in the first example.

Specifically, as shown in FIG. 2, the vibration damper 1, by engaging the first clutch C1 and disengaging the second clutch C2, sets the route of the transmitting the power to the first route R1. As shown in FIG. 1a, in the first route R1, by engaging the first clutch C1, the transmission of torque from the input shaft 2 to the output shaft 3 via the damper mechanism 4 becomes possible. In other words, in the first route R1, the coil spring 43 is disposed on the drive wheel side (the transmission 20 side, upstream side) of the first clutch C1. In this case, the planetary mechanism 5 performs a function of rotating the sun gear 5s with the speed such that a difference with the speed of ring gear 5r and the carrier 5c is increased or decreased, but does not function as a transmission between the input shaft 2 and the output shaft 3.

In a case in which the power transmission route is set to the first route R1, in a state of a pulsation of torque (fluctuation in rotation) not generated in the engine 10, a difference in an angular acceleration (or a change in the relative speed) of the engine 10 and an angular acceleration of the output shaft 3 does not arise, and the coil spring 43, the output element 42 and the input element 41 of the damper mechanism 4 rotate with identical rotational speed. Furthermore, in this state, the ring gear 5r, the carrier 5c, each pinion gear 5p and the sun gear 5s of the planetary mechanism 5 rotate integrally at an identical rotational speed.

On the other hand, in a case in which the power transmission route is set to the first route R1, as there is a pulsation of torque of the engine 10 and the torsional vibrations are generated, by the coil spring 43 absorbing the torsional vibrations while undergoing elastic deformation in the direction of rotation of the ring gear 5r, the transmission of the torsional vibrations from the engine 10 to the output shaft 3 (transmission 20) is reduced.

Furthermore, as there is a fluctuation in torque of the engine 10, since the torque acting on the damper mechanism 4 changes, an amount of compression of the coil spring 43 in the damper mechanism 4 changes and generates a helix angle θ. In the damper mechanism 4, in the direction of rotation, the output element 42 assumes a position of twist by the helix angle θ with respect to the input element 41. By the fluctuation in torque being a fluctuation of a predetermined width (amplitude), as the torque that had increased temporarily is lowered (decreases) thereafter, the coil spring 43 that was compressed, is elongated. The pulsation of torque is absorbed by such repetition of compression and elongation of the coil spring 43. The torque corresponding to an amount of compression of the coil spring 43 acts on the output shaft 3. Since this torque becomes a torque having the fluctuation reduced due to the damper mechanism 4 as described above, eventually, the fluctuation in torque in the output shaft 3 is reduced.

Moreover, by the amount of compression of the coil spring 43 in the damper mechanism 4 changing as described above, a relative rotation with the ring gear 5r and the carrier 5c is generated. In this case, the second clutch C2 is in disengagement and the sun gear 5s to rotate freely so that the speed of the sun gear 5s may be changed. The torque that changes the speed of the sun gear 5s is an inertial torque Ti corresponding to an angular acceleration of the sun gear 5s and a moment of inertia of the sun gear 5s, and the inertial torque Ti acts as a damping torque that suppresses the fluctuation in torque of the ring gear 5r and the carrier 5c caused due to the pulsation of torque of the engine 10.

In such manner, in a case in which, the first route R1 is selected as the power transmission route, a state in which the inertial torque by the sun gear 5s is made to act on the power transmission route has been set. In other words, by switching the power transmission route to the first route R1 by the switching mechanism C, switching to a state in which the vibration damper 1 can be operated has been carried out.

(2-1-1. Operating Condition of Inertia Mechanism)

Moreover, a damper torque Tk and the inertial torque Ti will be described below by referring to FIG. 3. FIG. 3 is a nomographic diagram showing an operating condition of the planetary mechanism 5 in a case of generating the damper torque Tk and the inertial torque Ti. The nomographic diagram is a diagram in which, the sun gear 5s, the carrier 5c, and the ring gear 5r which are the rotary components of the planetary mechanism 5 are indicated by vertical lines, and distances in between the three are let to be distances corresponding to a gear ratio ρ of the planetary mechanism 5. In the nomographic diagram, a vertical direction with respect to horizontal lines represents the rotational direction, and a position in the vertical direction represents the rotational speed. In FIG. 3, each rotary element of the planetary mechanism 5 is denoted by a symbol, where, S denotes the sun gear 5s, C denotes the carrier 5c, and R denotes the ring gear 5r, and moreover, IN denotes an input element (engine 10 and input shaft 2) of the planetary mechanism 5, and OUT denotes an output element (transmission 20 and output shaft 3) of the planetary mechanism 5. Furthermore, square marks shown in FIG. 3 indicate a state in which the damper torque Tk and the inertial torque Ti are generated, and circle marks indicate a state in which the damper torque Tk and the inertial torque Ti are not generated.

As shown in FIG. 3, by the damper torque Tk in a forward direction being generated in the damper mechanism 4, the damper torque Tk acts on the carrier 5c (output shaft 3), and the inertial torque Ti in a counter direction caused due to the damper torque Tk is generated in the sun gear 5s. Whereas, if the damper torque Tk in the counter direction is generated in the damper mechanism 4, the inertial torque Ti in the forward direction is generated in the sun gear 5s. Furthermore, the number of rotations (rotational speed) of the sun gear 5s changes to the direction of the damper torque Tk, and the sun gear 5s rotates relatively with respect to the output shaft 3 (carrier 5c). In other words, the sun gear 5s is rotated passively by the output shaft 3 while generating the inertial torque Ti in an opposite direction with respect to the damper torque Tk corresponding to an angular acceleration difference Δα between the output shaft 3 and the crank shaft (input shaft 2) of the engine 10. Since the inertial torque Ti acts on the output shaft 3 as a reaction force when the damper torque Tk acts on the sun gear 5s, the direction of the inertial torque Ti acting on the output shaft 3 is a counter direction, and is a direction opposite to the damper torque Tk. In other words, in the vibration damper 1, when the damper mechanism 4 is operated, the planetary mechanism 5 functions as the inertia mechanism, and the sun gear 5s functions as the inertial body I due to the damper torque Tk. An example of a pulsation (waveform) in the damper torque Tk and the inertial torque Ti acting on the output shaft in such manner is shown in FIG. 4c.

Figure 4:
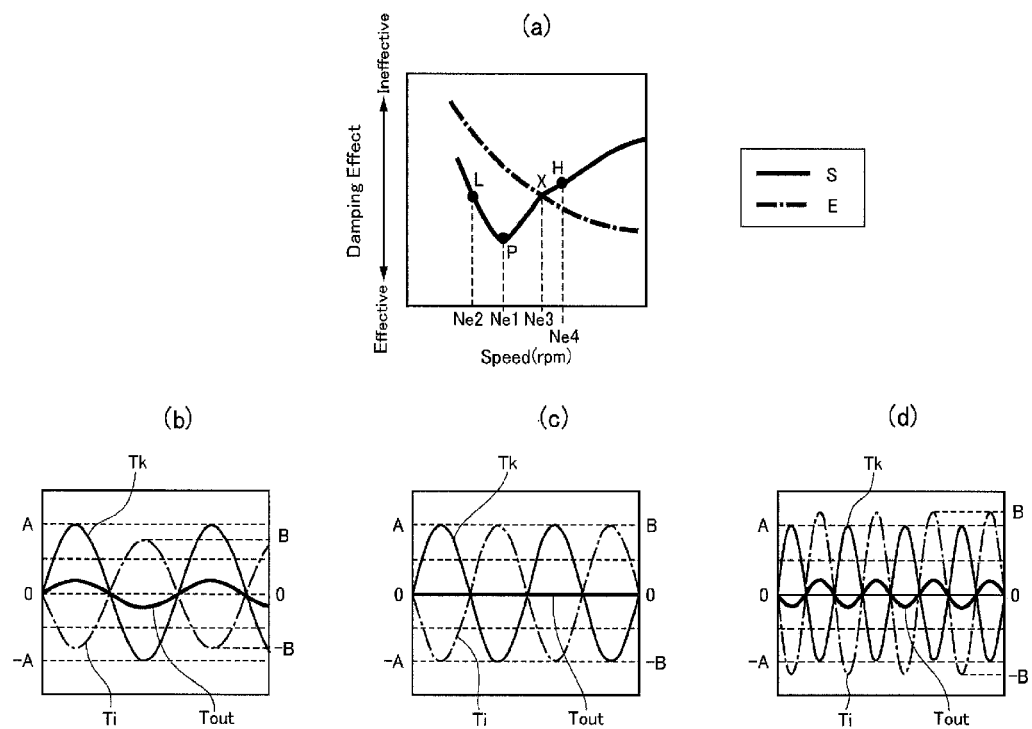
FIG. 4a is an explanatory diagram showing a vibration damping effect by a vibration damper when the power transmission route is set to the first route and an effect by a conventional vibration damper.
FIG. 4b, FIG. 4b, and FIG. 4c are waveform diagrams showing an example of a torque pulse acting on an output shaft according to the speed of an engine.

The example shown in FIG. 4c is a case in which an amplitude A of the damper torque Tk and an amplitude B of the inertial torque Ti are same. As shown in FIG. 4c, a phrase of the inertial torque Ti is shifted by π radian (180°) with respect to the damper torque Tk, and in the case in which the amplitude A of the damper torque Tk and the amplitude B of the inertial torque Ti are same, the damper torque Tk which fluctuates in an output torque Tout outputted from the output shaft 3 to the transmission 20 is cancelled completely. In this case, the torsional vibrations transmitted from the engine 10 to the transmission 20 are reduced most effectively. FIG. 4 will be described later in detail.

2-2. Second Route

As shown in FIG. 2, the vibration damper 1, by disengaging the first clutch C1 and engaging the second clutch C2, sets the second route R2 to a route capable of transmitting power. As shown in FIG. 1b, by the sun gear 5s, each pinion gear 5p, the carrier 5c, and the ring gear 5r being rotated integrally by engaging the second clutch C2, the transmission of torque from the input shaft 2 to the output shaft 3 via the planetary mechanism 5 becomes possible. In other words, the sun gear 5s, which was the inertial body I in the first route R1, functions as a rotary member in the second route R2. For instance, the operating condition of the planetary mechanism 5 when the power transmission route is set to the second route R2, the speed of each rotary element is same as shown by the circle marks in FIG. 3. Therefore, in the second route R2, the engine 10 is connected directly to the transmission 20, and a speed ratio γ of the input shaft 2 and the output shaft 3 becomes '1'. Furthermore, in a case in which the power transmission route is set to the second route R2, since the first clutch C1 is in disengagement, the damper torque Tk corresponding to the abovementioned angular acceleration difference Δα is not generated in the damper mechanism 4.

3. Damping Effect

Figure 31:
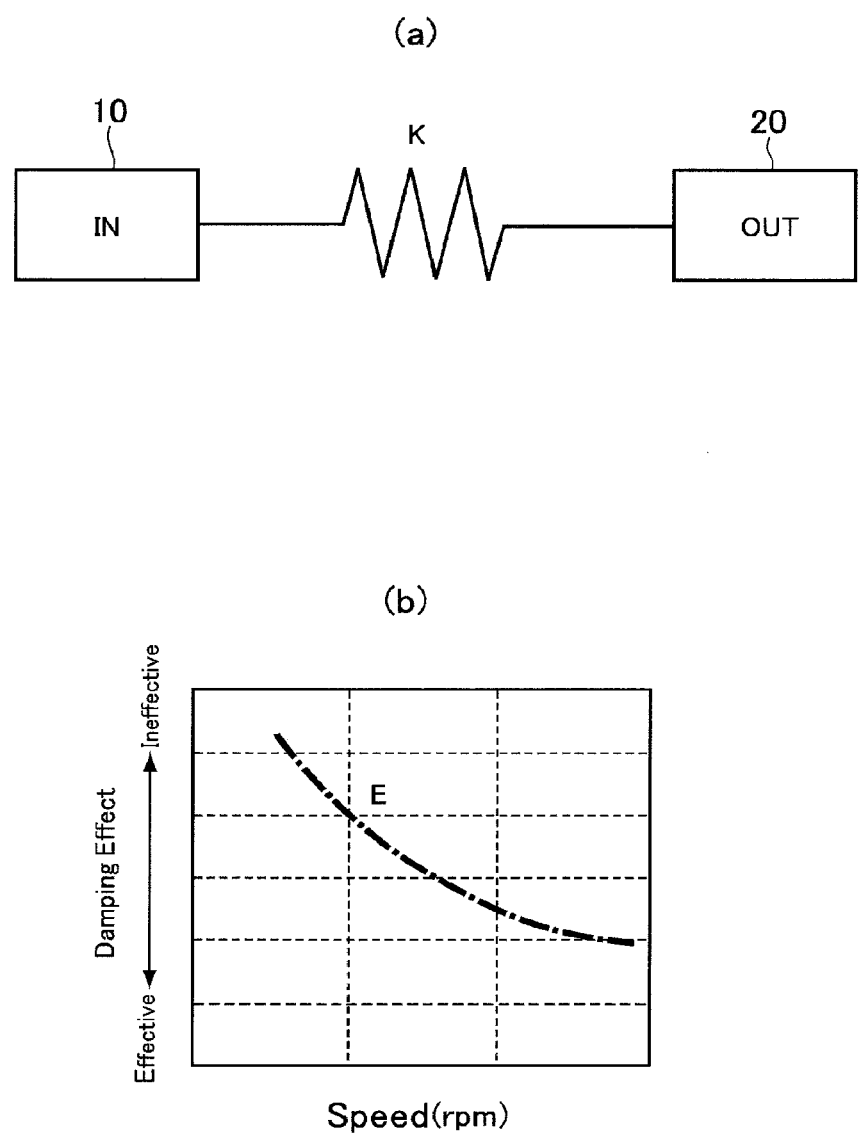
FIG. 31 shows an example of a conventional technology, where.

Here, a damping effect by the vibration damper 1 in a case in which the power transmission route is set to the first route R1 will be described below by referring to FIG. 4. As an example for comparison, an example of arrangement according to the conventional technology in which, an elastic member K is disposed all the time in the power transmission route between the engine 10 and the transmission 20 is shown in FIG. 31a. Moreover, in FIG. 31b, a damping effect (hereinafter, referred to as 'the conventional effect') E according to the example for comparison is shown by an alternate long and short dashed line. In FIG. 4a, the conventional effect E according to the example for comparison is shown by an alternate long and short dashed line, and a damping effect S by the vibration damper 1 in the case in which the power transmission route is set to the first route R1 is shown by a solid line. In FIG. 4a and FIG. 31b, a vertical axis indicates the magnitude of the damping effect, and a horizontal axis indicates the engine speed.

As shown in FIG. 4a, in the damping effect S of the vibration damper 1, the magnitude of the damping effect changes according to the engine speed Ne, and when the engine speed Ne becomes a predetermined engine speed Ne1, the magnitude of the damping effect assumes a peak state P in which the damping effect S is the highest. In the peak state P of the damping effect S by the vibration damper 1, the damper torque Tk inputted to the output shaft 3 from the damper mechanism 4 is cancelled completely by the inertial torque Ti as shown in the abovementioned FIG. 4c, and there is no pulsation due to the vibration damper 1 in the output torque Tout. Furthermore, the vibration damper 1 exerts a damping effect superior to the conventional effect E in the peak state P. In other words, by making the sun gear 5s as an inertial body, the damping effect in a low speed region is improved to be superior to the damping effect by the conventional technology.

Moreover; as shown in FIG. 4a, when the engine speed Ne becomes lower than the predetermined speed Ne1 in the peak state P the damping effect S of the vibration damper 1 is weakened with the reduction of the engine speed Ne. In the region of lower speed, a low-speed state L in which the engine speed Ne becomes Ne2 is indicated by a point L in FIG. 4a. Moreover as shown in FIG. 4b, in the low-speed state L, the amplitude A of the damper torque Tk is larger than the amplitude B of the inertial torque Ti by the sun gear 5s. In other words, since the damper torque Tk generated by the torsional vibrations inputted to the damper mechanism 4 is not cancelled completely by the inertial torque Ti, the output torque Tout in the output shaft 3 fluctuates with the same phase as of the damper torque Tk. Although the damping torque (inertial torque Ti) as the vibration damper 1, of the vibration damper 1 in the low-speed running state L is weaker than that in the peak state P, the damping effect superior to the conventional effect E is exerted. In the low-speed running state L, since the engine speed Ne2 is lower than the predetermined speed Ne1 in the peak state P, a frequency of the damper torque Tk and a frequency of the inertial torque Ti are lower than that in the peak state P.

Furthermore, as shown in FIG. 4a, when the engine speed Ne is in a region higher than the predetermined speed Ne1 in the peak state P, the damping effect S of the vibration damper 1 is weakened with a rise in the engine speed Ne. Moreover, in the high speed region, a running state X in which the engine speed becomes Ne3 is shown by a point X in FIG. 4a. From the engine speed Ne3 as a border line, a relation of magnitude of the damping effect S of the vibration damper 1 and the conventional effect E are reversed. In other words, when the engine speed Ne is lower than the predetermined speed Ne3, the damping effect S of the vibration damper 1 is stronger than the conventional effect E, and conversely, when the engine speed Ne is higher than the predetermined speed Ne3, the damping effect S of the vibration damper 1 is weaker than the conventional effect E.

For instance, as shown in FIG. 4a, when the engine speed Ne is in a region higher than the predetermined speed Ne3, with the rise in the engine speed Ne, the damping effect S of the vibration damper 1 is declined to be weaker than the conventional effect E. In the higher speed region, a high-speed state H in which the engine speed becomes Ne4 is indicated by a point H in FIG. 4a. Moreover, as shown in FIG. 4d, in the high-speed state H, the amplitude A of the damper torque Tk is smaller than the amplitude B of the inertial torque Ti by the sun gear 5s. In this case, the damping torque of the vibration damper 1 becomes higher than the torsional vibrations. In other words, since the vibration (pulsation in torque) caused due to the inertial torque Ti is generated in the output shaft 3, the output torque Tout fluctuates with the same phase as of the inertial torque Ti in the output shaft 3. In the vibration damper 1 in the high-speed state H, the damping torque (inertial torque Ti) as the vibration damper 1 acts on the output shaft 3 excessively more than in the peak state P, and the sun gear 5s acts as a vibratory force on the output shaft 3, and the damping effect S becomes weaker than the conventional effect E. In the high-speed state H, since the engine speed Ne4 is higher than the predetermined speed Ne1 in the peak state P, the frequency of the damper torque Tk and the frequency of the inertial torque Ti become higher than that in the peak state P.

As described above, relative merits of the damping effect by the vibration damper 1 which is the example of the present invention with respect to the merits of the conventional technology are inversed from the predetermined speed Ne3 as a border line. The example cited as the conventional technology is an example in which, a spring damper mechanism without an inertial body or the damping effect due to the inertial body has been provided. Such transmission route of power is similar to a transmission route in which, a damper mechanism is provided to a clutch which selectively connects an engine and a transmission, or a transmission route in which, a damper mechanism is built-in in the transmission 20. Consequently, in a case in which, the abovementioned vibration damper 1 which is the example of the present invention is incorporated in a vehicle provided with a normal clutch or a spring damper mechanism of this type, it is possible to achieve a damping effect shown by a solid line and a damping effect shown by a dashed line in FIG. 4a. In other words, the switching control of the switching mechanism is to be carried out in accordance with the engine speed Ne by the aforementioned ECU 6. In this case, the ECU 6 corresponds to the controller in the example of this invention.

Figure 5:
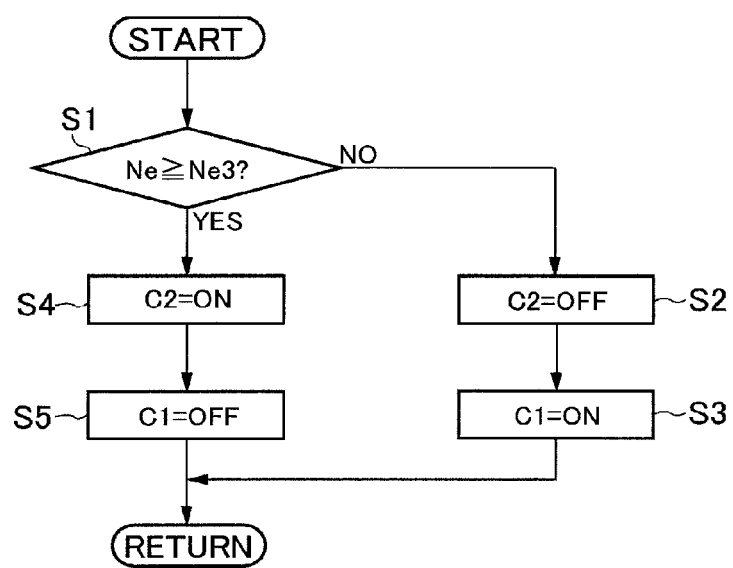
FIG. 5 is a flowchart for explaining an example of a control of the switching mechanism executed by a controller.

An example of a control thereof is shown by a flowchart in FIG. 5. The control shown in FIG. 5 is to be carried out for a vehicle in which the damping effect is generated by a predetermined spring damper mechanism even in a case in which the torque is transmitted from the input shaft 2 to the output shaft 3 by the second route R2. An example of such type of spring damper mechanism is a mechanism to be provided between the engine 10 and the input shaft 2, and is indicated by dashed lines in FIG. 1.

A routine shown in FIG. 5 is carried out repeatedly at every predetermined time interval as long as the engine 10 is in operation. Firstly, it is determined whether or not the engine speed Ne is higher than or equal to the abovementioned predetermined speed Ne3 (at step S1). Since the engine speed Ne is being detected all the time for the engine control, detection values thereof are to be used. Moreover, the predetermined speed Ne3 can be measured practically or can be calculated in advance by simulating.

If the answer of step S1 is NO, the engine speed Ne being low and the damping using the aforementioned inertial body I and the damper mechanism K being effective, the second clutch C2 is disengaged (OFF) (at step S2), and the first clutch C1 is engaged (ON) (at step S3), and then returns. In other words, the aforementioned first route R1 is set. Consequently, the vibration damper 1 is operated, and the damping effect thereof, as shown in FIG. 4a is superior to the damping effect by the conventional technology, and it is possible to reduce effectively the vibrations in a state in which the engine speed Ne falls within the low speed region.

By contrast, if the engine speed Ne is higher than or equal to the predetermined speed Ne3 so that the answer of step S1 is YES, the second clutch C2 is engaged state (ON) (at step S4), and the first clutch C1 is disengaged (OFF) (at step S5), and then returns. In other words, the aforementioned second route R2 is set. Consequently, the input shaft 2 and the output shaft 3 are connected via the planetary mechanism 5 integrated as a whole, and there is no mechanism that specifically carries out damping reduction interposed between the input shaft 2 and the output shaft 3. A spring damper mechanism D is interposed between the engine 10 and the transmission 20. Since the spring damper mechanism D does not include a member that generates the inertial torque for damping, the damping effect has characteristics as shown by the dashed line in FIG. 4(a). In a case in which, the engine speed Ne is higher than or equal to the predetermined speed Ne3, since the reduction in damping is carried out by the damper mechanism D having the damping characteristics shown by the dashed line, it is possible to prevent or suppress the vibrations of a vehicle from being deteriorated. Moreover, in this case, since an effect of absorbing the torque by a displacement of the spring becomes weak, a delay in change in the torque of the output shaft 3 corresponding to change in the torque of the engine 10 is suppressed. Therefore, the response of a drive torque with respect to the acceleration operation is improved.

As described above, according to the vibration damper of the first example, by making the inertial torque by the inertial body act selectively on the power transmission route according to the running conditional of a vehicle, it is possible to reduce effectively the torsional vibrations transmitted by the power transmission route, and to suppress the response of the vehicle from being declined. According to the control shown in FIG. 5, even in examples to be described below, by providing a spring damper mechanism similar to the spring damper mechanism D, and implementing similarly as in the first example, it is possible to achieve a similar action and effect.

4. Second Example

Next, a vibration damper according to a second example will be described below. The second example, unlike the first example, has an arrangement such that rotary elements of a planetary mechanism which functions as an inertial body when the power transmission route is set to the first route, are to be fixed when the power transmission route is set to the second route. Therefore, when the power transmission route has been set to the second route in the second example, the planetary mechanism functions as a transmission, and the speed ratio from an input shaft to an output shaft becomes a value other than '1'. The second example will be described below specifically by referring to FIG. 6. In the description of the second example, description of arrangements similar as in the first example is omitted, and same reference numerals are used.

Figure 6:
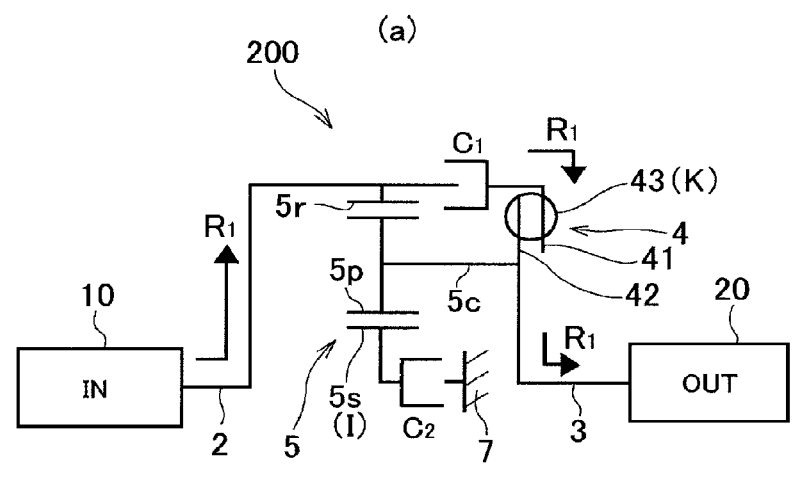
FIG. 6 shows a vibration damper according to a second example, where.
Figure 6:
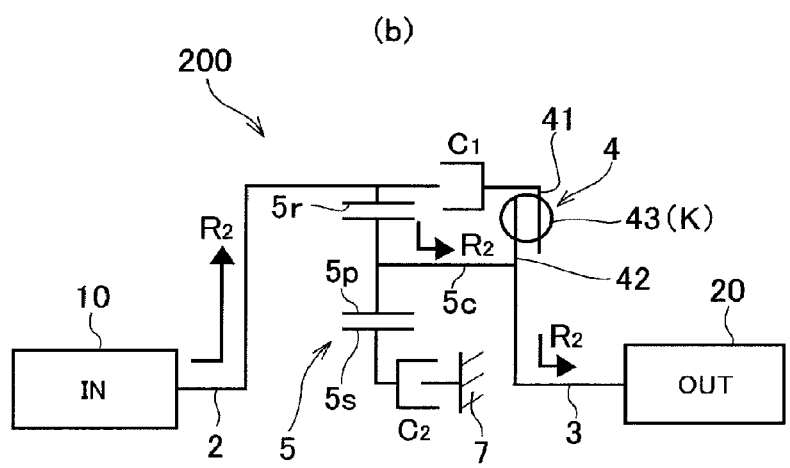

As shown in FIG. 6, in a vibration damper 200 of the second example, the second clutch C2 selectively connects the sun gear 5s to a fixed portion 7 such as a case. In the second clutch C2, an engagement element on a fixed side is connected to (integrated with) the fixed portion 7, and an engagement element on a rotating side rotates integrally with the sun gear 5s. The fixed portion 7 is disposed on the transmission 20 side of the planetary mechanism 5 in an axial direction.

As shown in FIG. 6a, the vibration damper 200 makes the sun gear 5s of the planetary mechanism 5 function as the inertial body I by setting the power transmission route to the first route R1 by engaging the first clutch C1 and disengaging the second clutch C2. In the second example, the damping effect by the planetary mechanism 5 when the power transmission route is set to the first route R1 is similar as in the abovementioned first example.

As shown in FIG. 6b, the vibration damper 20 fixes the sun gear 5s to the fixed portion 7 by setting the power transmission route to the second route R2 by disengaging the first clutch C1 and engaging the second clutch C2. The second clutch R2 connects the sun gear 5s to the fixed portion 7. Consequently, in the planetary mechanism 5 in the second route R2, the sun gear 5s (third rotary element) serves as a fixed element, the carrier 5c (second rotary element) serves as an output element, and the ring gear 5r (first rotary element) serves as an input element, so that the planetary mechanism 5 function as the transmission device. In other words, the speed ratio by the planetary mechanism 5 becomes a value other than '1'.

Figure 7:
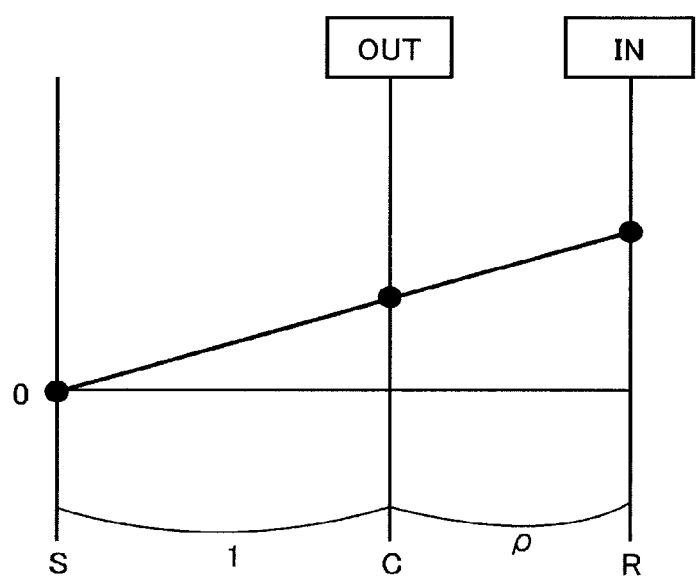
FIG. 7 is a nomographic diagram showing an operating condition of a planetary mechanism functioning as a transmission device when the power transmission route is set to the second route in the second example.

FIG. 7 is a nomographic diagram showing an operating condition of the planetary mechanism 5 functioning as a transmission device when the power transmission route is set to the second route R2. As shown in FIG. 7, by stopping the rotation of the sun gear 5s to establish the reaction torque, the speed of the carrier 5c as the output element becomes lower than that of the ring gear 5r as the input element. In other words, the speed ratio of the planetary mechanism 5 becomes larger than '1', and the planetary mechanism 5 functions as a transmission device. Therefore, in the second route R2 of the second example, the speed ratio γ of the input shaft 2 and the output shaft 3 becomes larger than '1', and the torque from the engine 10 can be amplified by the planetary mechanism 5 and transmitted to the output shaft 3. Consequently, the fixed member 7 corresponds to 'the member to which the torque is applied' in the examples of this invention.

As described above, according to the second example, an effect similar to that of the first example is achieved, and it is possible to make the planetary mechanism which functions as the inertia mechanism when the power transmission route is set to the first route, function as a transmission device when the power transmission route is set to the second route.

Figure 8:
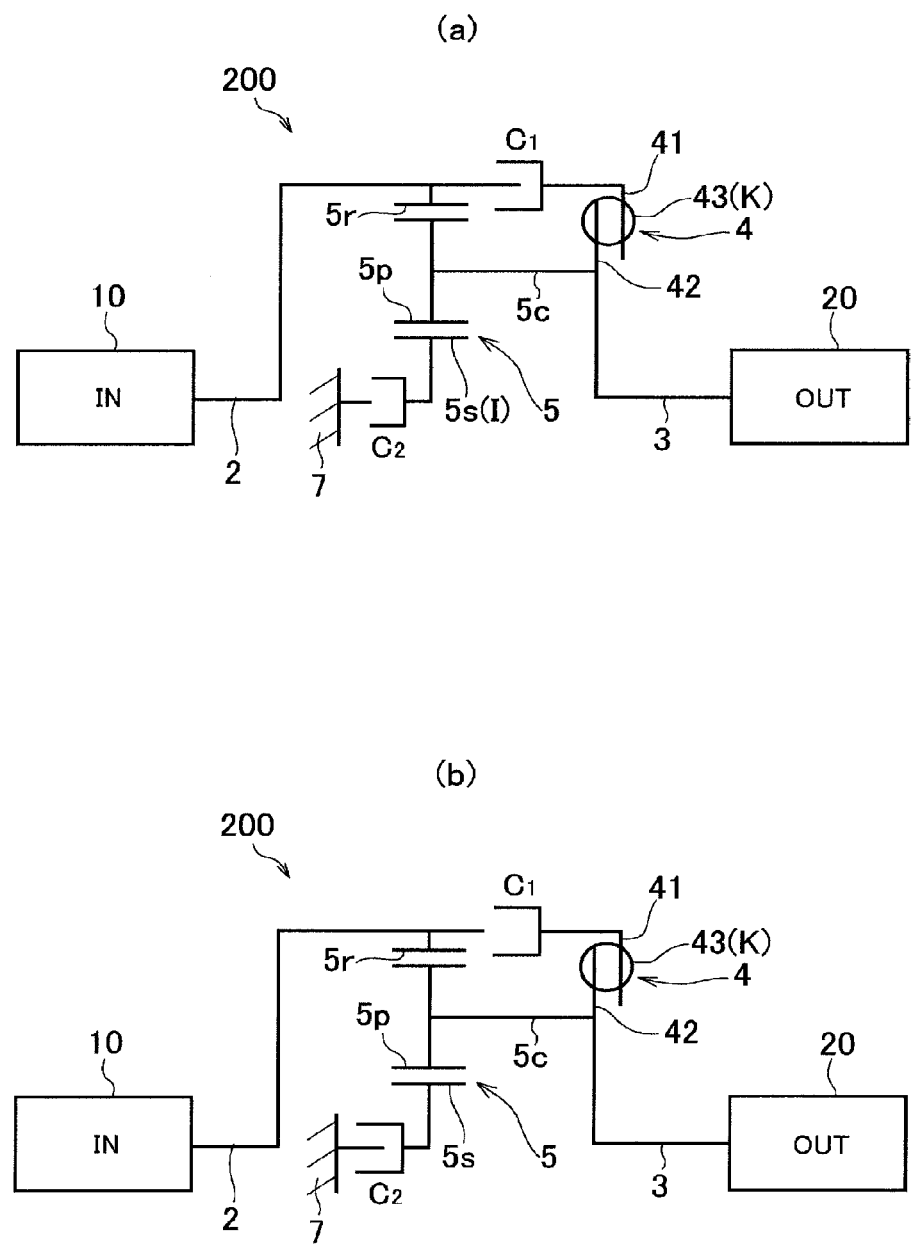
FIG. 8 shows a case in which a location of a fixed portion is changed as a modified example of the second example, where.

In the abovementioned description of the second example, although the fixed portion 7 is to be provided on the transmission 20 side of the planetary mechanism 5 in the axial direction, a position at which the fixed portion 7 is to be provided is not limited to the abovementioned position, provided that it is a position at which the sun gear 5s can be fixed selectively. For instance, as in the vibration damper 200 shown in FIG. 8, it is also possible to provide the fixed member 7 on the engine 10 side of the planetary mechanism 5 in the axial direction.

Furthermore, the vibration damper of this invention is not limited to the abovementioned first example and the second example, and can be modified appropriately within a scope without departing from the object of the scope of this invention.

5. Modified Example of First Example

Figure 9:
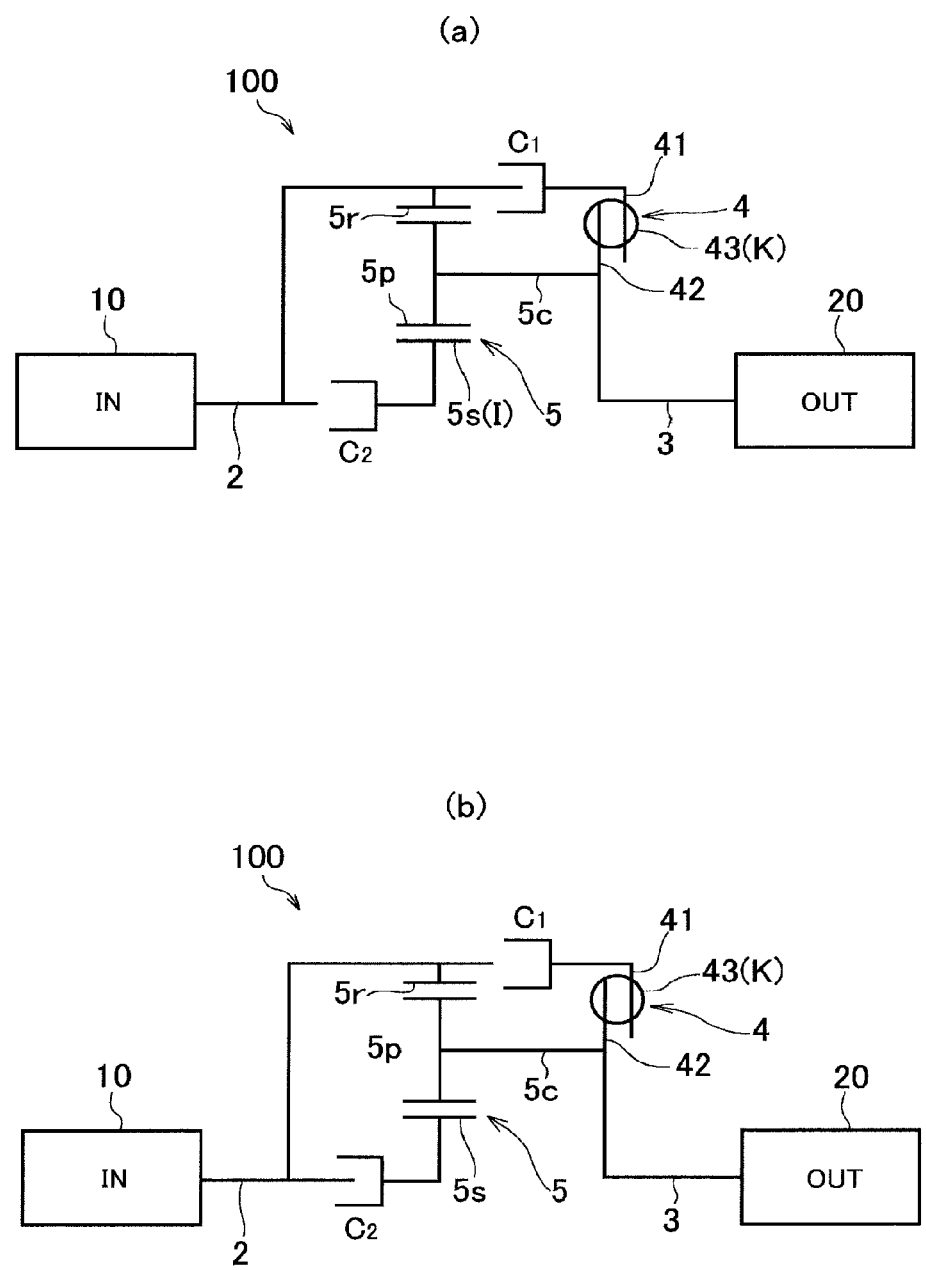
FIG. 9 shows a vibration damper in which a sun gear is connected selectively to an input shaft, as a modified example of the first example, where.

For instance, in the abovementioned first example, the arrangement of selectively coupling the sun gear 5s functioning as the inertial body I to the output shaft 3 by the second clutch C2 has been described. However, this invention is not limited to this arrangement, and may be arranged as the vibration damper 100 including the second clutch C2 which selectively connects the sun gear 5s to the input shaft 2 as shown in FIG. 9. The second clutch C2 of this vibration damper 100 connects the sun gear 5s selectively to the input shaft 2 or the ring gear 5r. Consequently, the input shaft 2 or the ring gear 5r corresponds to 'the member to which the torque is applied' in the examples of this invention. In the second clutch C2, the engagement element on the input side rotates integrally with the input shaft 2, the ring gear 5r, and the engagement element on the input side in the first clutch C1, and the engagement element of the output side rotates integrally with the sun gear 5s. The vibration damper 100, when the power transmission route is set to the first route R1 shown in FIG. 9a and when the power transmission route is set to the second route R2 shown in FIG. 9b, functions similarly as in the abovementioned first example. Furthermore, when the power transmission route is set to the first route R1, an operating condition of the planetary mechanism 5 in the vibration damper 100 is similar to the operating condition shown in the abovementioned nomographic diagram in FIG. 3.

To sum it up, in a case in which all the rotary elements in the planetary mechanism rotate integrally by engaging the second clutch, the rotary element that functions as the inertial body may be connected to any of the input shaft or the output shaft. Consequently, as a vibration damper 110 of a third example in which the ring gear 5r of the planetary mechanism 5 shown in FIG. 10 functions as the inertial body I, or a vibration damper 130 of a fourth example in which the carrier 5c of the planetary mechanism 5 shown in FIG. 13 functions as the inertial body I, it is possible to couple the rotary element (third rotary element) as the inertial body I to the input shaft 2 or the output shaft 3. In the following description of the third example and the fourth example, description of arrangements similar as in the first example is omitted, and same reference numerals are used.

5-1. Third Example

Figure 10:
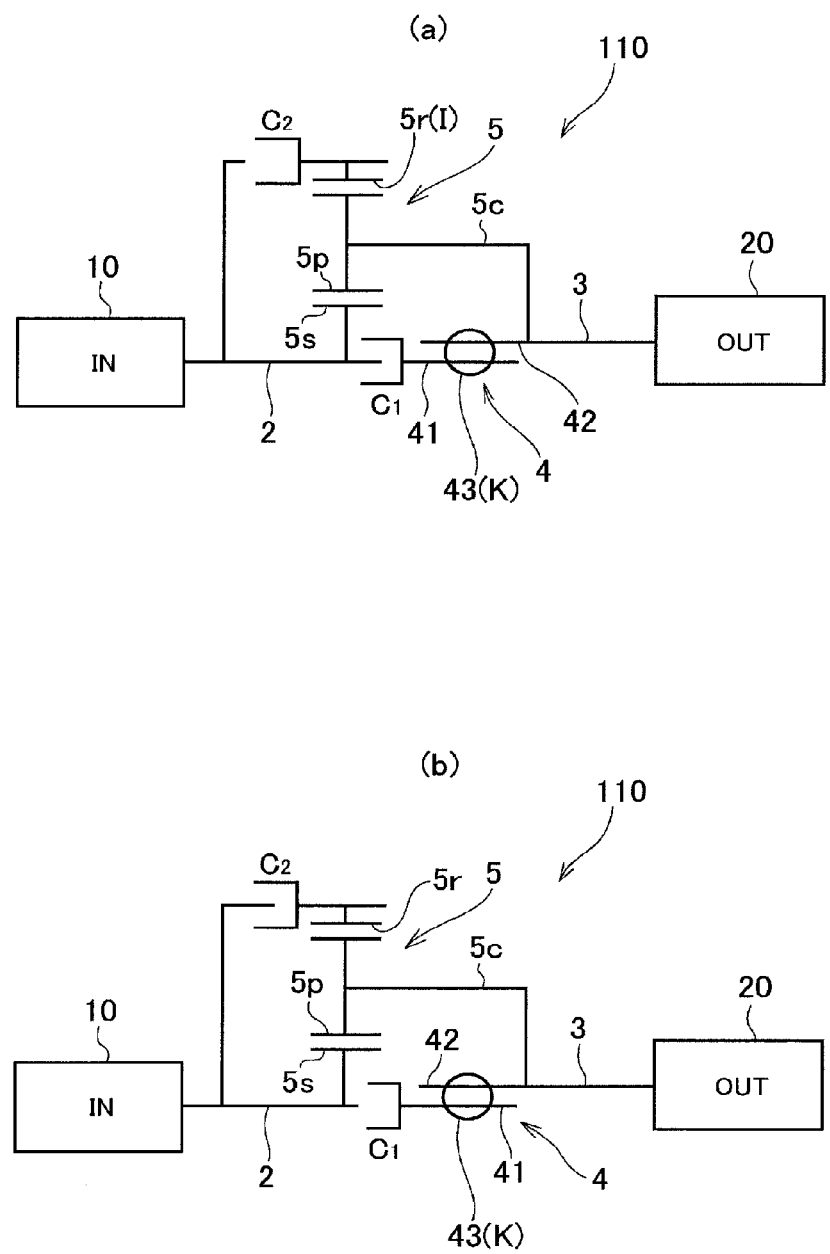
FIG. 10 shows a vibration damper according to a third example, where.

Firstly, the vibration damper 110 of the third example will be described below by referring to FIG. 10. As shown in FIG. 10a, when the power transmission route is set to the first route R1, in the planetary mechanism 5 of the vibration damper 110, the ring gear 5r (third rotary element) functions as the inertial body I, the sun gear 5s (first rotary element) rotates integrally with the input shaft 2, and the carrier 5c (second rotary element) rotates integrally with the output shaft 3. The second clutch C2 of the third example selectively connects the ring gear 5r as the inertial body I to the input shaft 2 or the ring gear 5r Consequently, the input shaft 2 or the ring gear 5r corresponds to 'the member to which the torque is applied' in the examples of this invention. In the second clutch C2, the engagement element of the output side rotates integrally with the ring gear 5r. Moreover, in the first clutch C1, the engagement element of the input side rotates integrally with the input shaft 2, the sun gear 5s, and the engagement element of the input side in the second clutch C2, and the engagement element of the output side rotates integrally with the input element 41 of the damper mechanism 4. Moreover, as shown in FIG. 10b, when the power transmission route is set to the second route R2, the ring gear 5r rotates integrally with the sun gear 5s which is the input element and the carrier 5c which is the output element.

Figure 11:
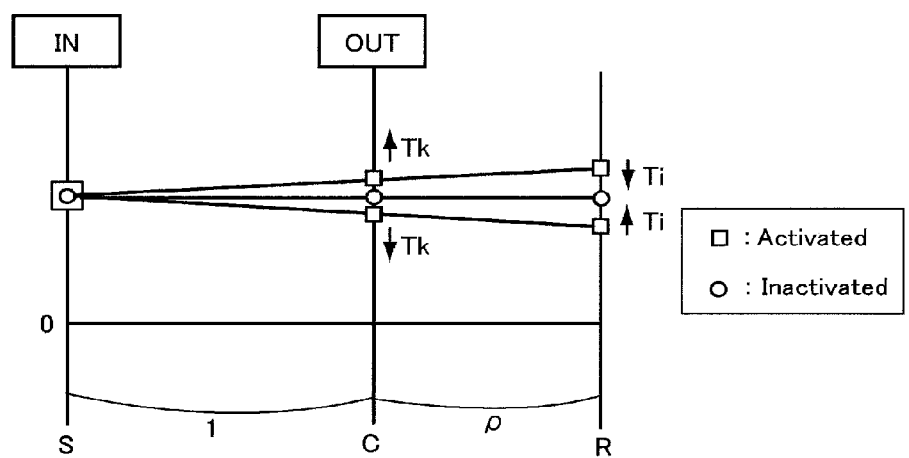
FIG. 11 is a nomographic diagram showing an operating condition of a planetary mechanism which functions as an inertia mechanism when the power transmission route is set to the first route in the third example.

Furthermore, when the power transmission route is set to the first route R1 in the third example, the planetary mechanism 5 in the vibration damper 110 assumes an operating condition shown in a nomographic diagram in FIG. 11. As shown in FIG. 11, the damper torque Tk acts on the carrier 5c (output shaft 3) by the damper torque Tk in the forward direction being generated in the damper mechanism 4, and the inertial torque Ti in the counter direction which is caused due to the damper torque Tk is generated in the ring gear 5r. Whereas, when the damper torque Tk in the counter direction is generated in the damper mechanism 4, the inertial torque Ti in the forward direction is generated in the ring gear 5r Furthermore, the number of rotations (rotational speed) of the ring gear 5r changes to the direction of the damper torque Tk, and the ring gear 5r rotates relatively with respect to the output shaft 3 (carrier 5c). In other words, the ring gear 5r is rotated passively by the output shaft 3 while generating the inertial torque Ti in the opposite direction with respect to the damper torque Tk corresponding to an angular acceleration difference $\Delta\alpha$ between the output shaft 3 and the crank shaft (input shaft 2) of the engine 10. Since the inertial torque Ti acts on the output shaft as a reaction force when the damper torque Tk acts on the ring gear 5r, the direction of the inertial torque Ti acting on the output shaft 3 acts becomes the opposite direction with respect to the damper torque Tk. In other words, in the vibration damper 110, when the damper mechanism 4 is operated, the planetary mechanism 5 functions as the inertia mechanism, and the ring gear 5r functions as the inertial body I due to the damper torque Tk. Even in the third example, an effect similar to the damping effect S described above by referring to FIG. 4 is exerted.

As described above, according to the vibration damper of the third example, even in a case in which the rotary element that functions as the inertial body is changed to a ring gear, and the ring gear is selectively connected to the input shaft or the output shaft, and locations of the switching mechanism and the damper mechanism are changed, it is possible to achieve an effect similar to that of the first example.

Figure 12:
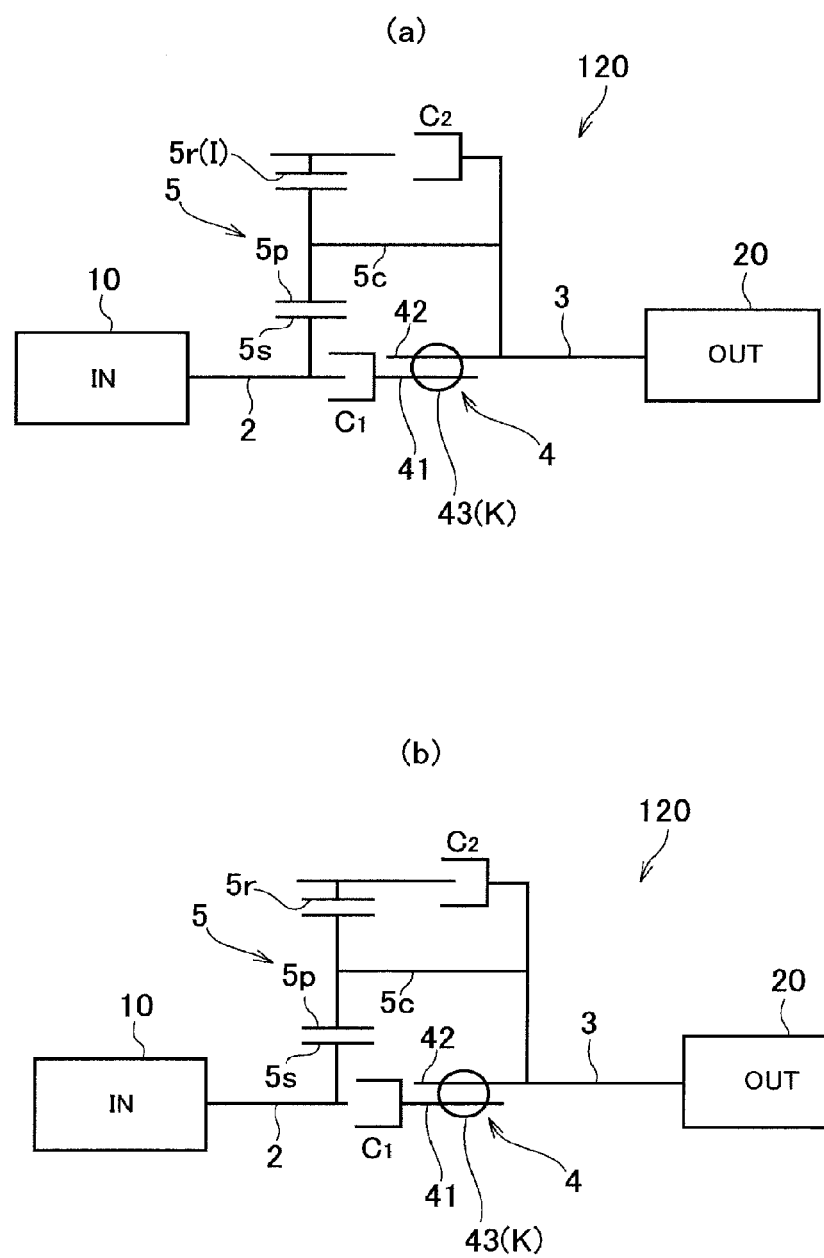
FIG. 12 shows a vibration damper in which a ring gear is connected selectively to an output shaft, as a modified example of the third example, where.

As a modified example of the abovementioned third example, as a vibration damper 120 shown in FIG. 12, the vibration damper may include the second clutch C2 which connects the ring gear 5r as the inertial body I to the output shaft 3 or the carrier 5c. The second clutch C2 shown in FIG. 12 connects the ring gear 5r selectively to the output shaft 3 or the carrier 5c. Consequently, the output shaft 3 or the carrier 5c corresponds to 'the member to which the torque is applied' in the examples of this invention. In the second clutch C2, the engagement element on the input side rotates integrally with the ring gear 5r, and the engagement element on the output side rotates integrally with the output shaft 3, the carrier 5c, and the output element 42 of the damper mechanism 4. Moreover, the vibration damper 120, when the power transmission route is set to the first route R1 shown in FIG. 12a, and when the power transmission route is set to the second route R2 shown in FIG. 12b, functions similarly as in the abovementioned third example.

5-2. Fourth Example

Figure 13:
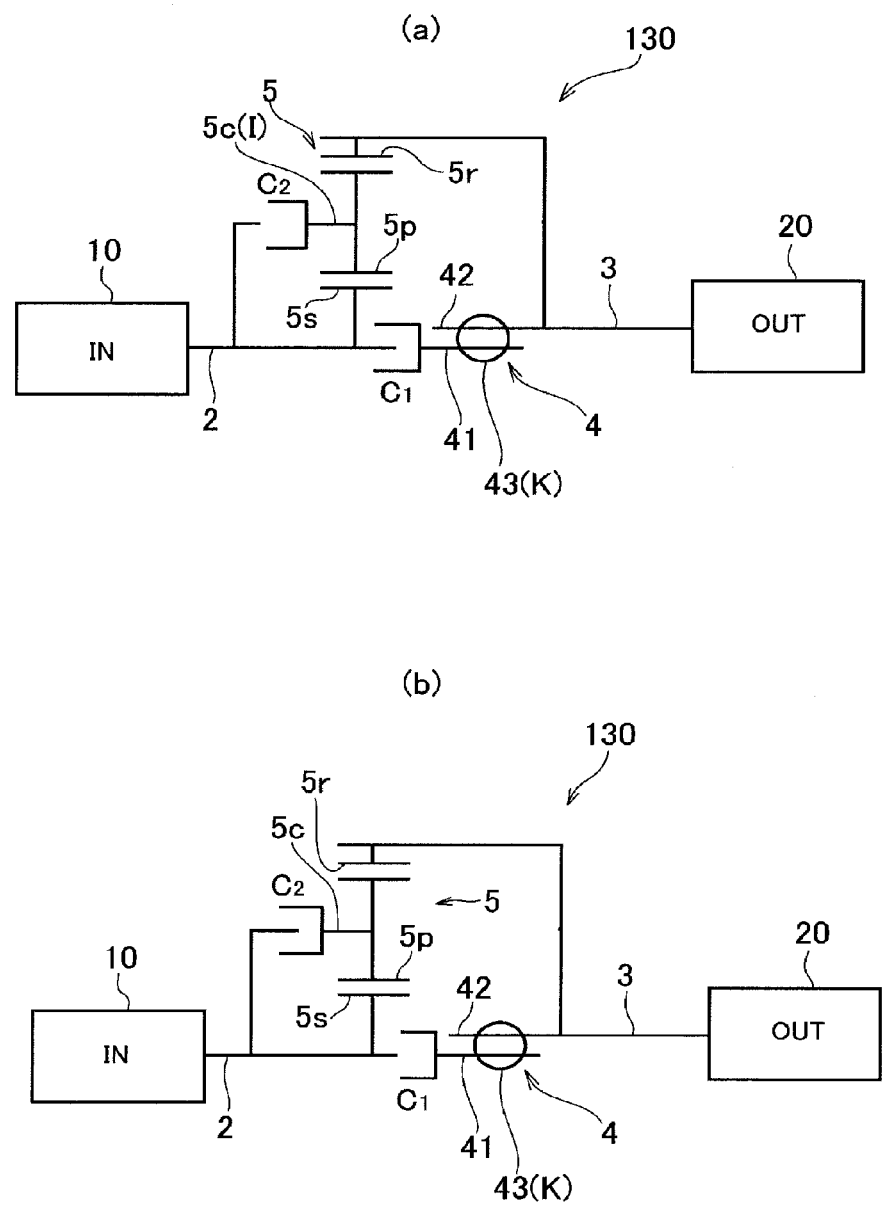
FIG. 13 shows a vibration damper according to a fourth example, where.

Next, the vibration damper 130 of the fourth example will be described below by referring to FIG. 13. As shown in FIG. 13a, when the power transmission route is set to the first route R1, in the planetary mechanism 5 of the vibration damper 130, the carrier 5c (third rotary element) functions as the inertial body I, the sun gear 5s (first rotary element) rotates integrally with the input shaft 2, and the ring gear 5r (second rotary element) rotates integrally with the output shaft 3. The second clutch C2 of the fourth example connects the carrier 5c as the inertial body I to the input shaft 2 or the sun gear 5s selectively. Consequently, the input shaft 2 or the carrier 5c corresponds to 'the member to which the torque is applied' in the examples of this invention. In the second clutch C2, the engagement element on the output side rotates integrally with the carrier 5c. Moreover, in the damper mechanism 4 of the fourth example, the output element 42 rotates integrally with the ring gear 5r and the output shaft 3. As shown in FIG. 13(b), when the power transmission route is set to the second route R2, the carrier 5c rotates integrally with the sun gear 5s which is the input element, and the ring gear 5r which is the output element. The first clutch C1 of the fourth example is arranged similarly as in the abovementioned third example.

Figure 14:
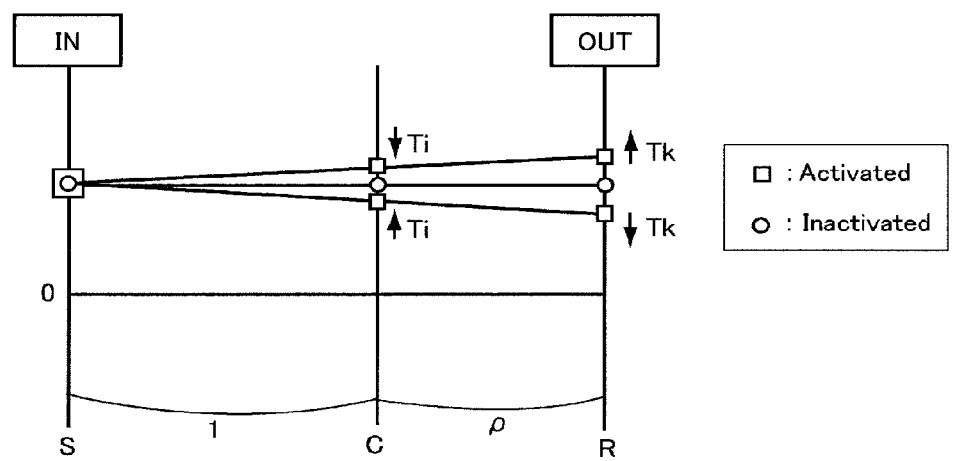
FIG. 14 is a nomographic diagram showing an operating condition of a planetary mechanism which functions as an inertia mechanism when the power transmission route is set to the first route in the fourth example.

Furthermore, when the power transmission route is set to the first route R1 in the fourth example, the planetary mechanism 5 in the vibration damper 130 assumes an operating condition shown in a nomographic diagram in FIG. 14. As shown in FIG. 14, the damper torque Tk acts on the ring gear 5r (output shaft 3) by the damper torque Tk in the forward direction being generated in the damper mechanism 4, and the inertial torque Ti in the counter direction which is caused due to the damper torque Tk is generated in the carrier 5c. Whereas, when the damper torque Tk in the counter direction is generated in the damper mechanism 4, the inertial torque Ti in the forward direction is generated in the carrier 5c. Furthermore, the number of rotations (rotational speed) of the carrier 5c changes to the direction of the damper torque Tk, and the carrier 5c rotates relatively with respect to the output shaft 3 (ring gear 5r). In other words, the carrier 5c is rotated passively by the output shaft 3 while generating the inertial torque Ti in the opposite direction with respect to the damper torque Tk corresponding to the angular acceleration difference Δα between the output shaft 3 and the crank shaft (input shaft 2) of the engine. Since the inertial torque Ti acts on the output shaft as a reaction force when the damper torque Tk acts on the carrier 5c, the direction of the inertial torque Ti acting on the output shaft 3 becomes the opposite direction with respect to the damper torque Tk. In other words, in vibration damper 130, when the damper mechanism 4 is operated, the planetary mechanism 5 functions as the inertia mechanism, and the carrier 5c functions as the inertial body I due to the damper torque Tk. Even in the fourth example, an effect similar to the damping effect S described by referring to FIG. 4 is exerted.

As described above, according to the vibration damper of the fourth example, even in a case in which the rotary element that functions as the inertial body is changed to a carrier, and the carrier is selectively connected to the input shaft or the output shaft, and the locations of the switching mechanism and the damper mechanism are changed, it is possible to achieve an effect similar to that of the first example.

Figure 15:
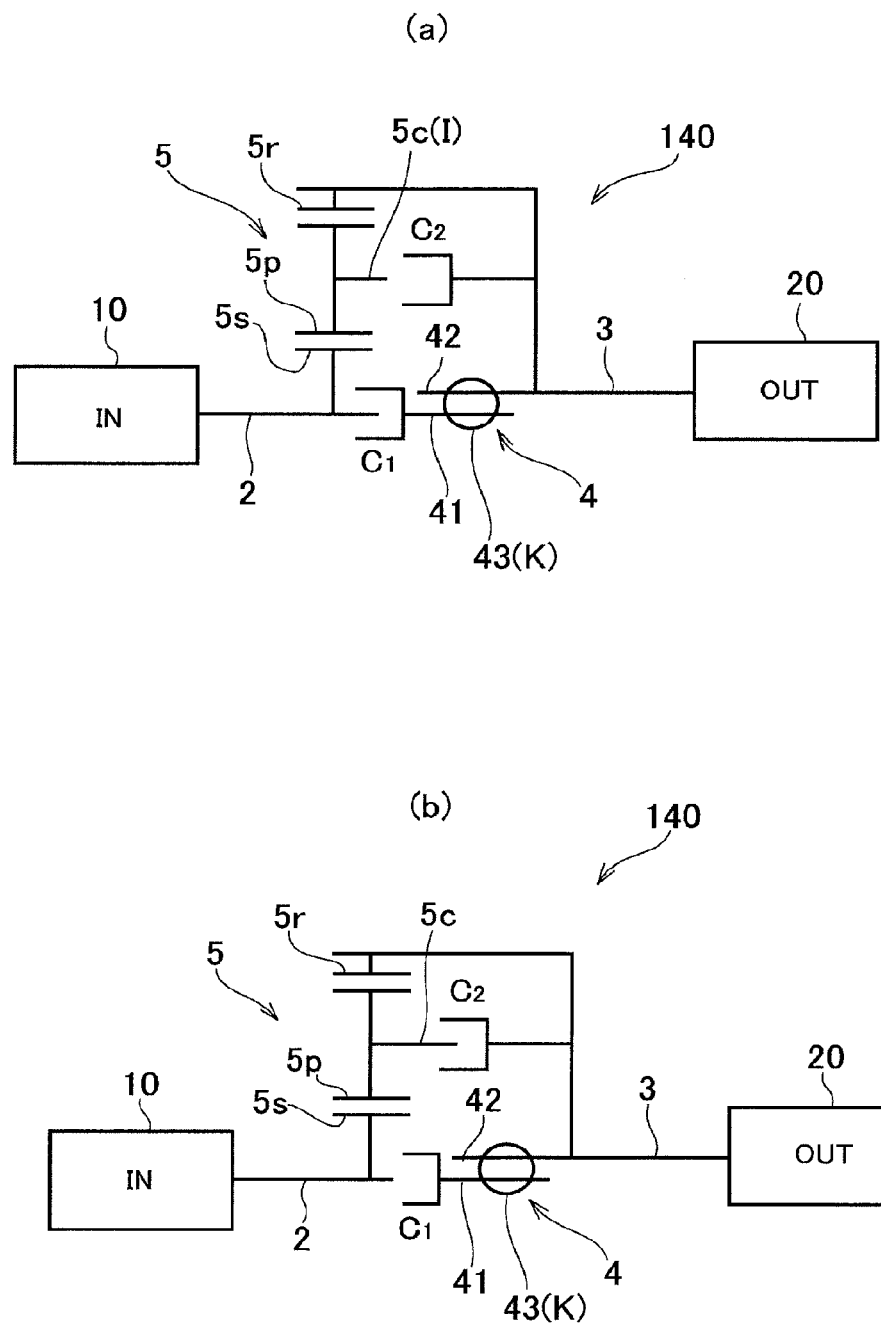
FIG. 15 shows a vibration damper in which a carrier is connected selectively to an output shaft, as a modified example of the fourth example, where.

As a modified example of the abovementioned fourth example, as a vibration damper 140 shown in FIG. 12, the vibration damper may include the second clutch C2 which connects the carrier 5c as the inertial body I to the output shaft 3 or the ring gear 5r. The second clutch C2 shown in FIG. 15 connects the carrier 5c selectively to the output shaft 3 or the ring gear 5r Consequently, the output shaft 3 or the ring gear 5r corresponds 'the member to which the torque is applied' in the examples of this invention. In the second clutch C2, the engagement element on the input side rotates integrally with the carrier 5c, and the engagement element on the output side rotates integrally with the output shaft 3, the ring gear 5r, and the output element 42 of the damper mechanism 4. Moreover, the vibration damper 140, when the power transmission route is set to the first route R1 shown in FIG. 15a, and when the power transmission route is set to the second route R2 shown in FIG. 15b, functions similarly as in the abovementioned fourth example.

6. Modified Example of Second Example

Moreover, it is possible to arrange a modified example for the second example. In the abovementioned second example, the arrangement in which, the sun gear 5s functioning as the inertial body I is connected selectively to the fixed portion 7 by the second clutch C2 has been described. However, this invention is not limited to this arrangement, and an arrangement may be made such that a rotary element other than the sun gear 5s functions as the inertial body I, and the rotary element as the inertial body I is fixed selectively by the second clutch C2. Specifically, as a vibration damper 210 of a fifth example in which the ring gear 5r of the planetary mechanism 5 shown in FIG. 16 functions as the inertial body I, an arrangement may be made such that the rotary element (third rotary element) as the inertial body is connected selectively to the fixed portion 7 by the second clutch C2. In the following description of the fifth example, description of arrangements similar as in the second example is omitted, and same reference numerals are used.

6-1. Fifth Example

Figure 16:
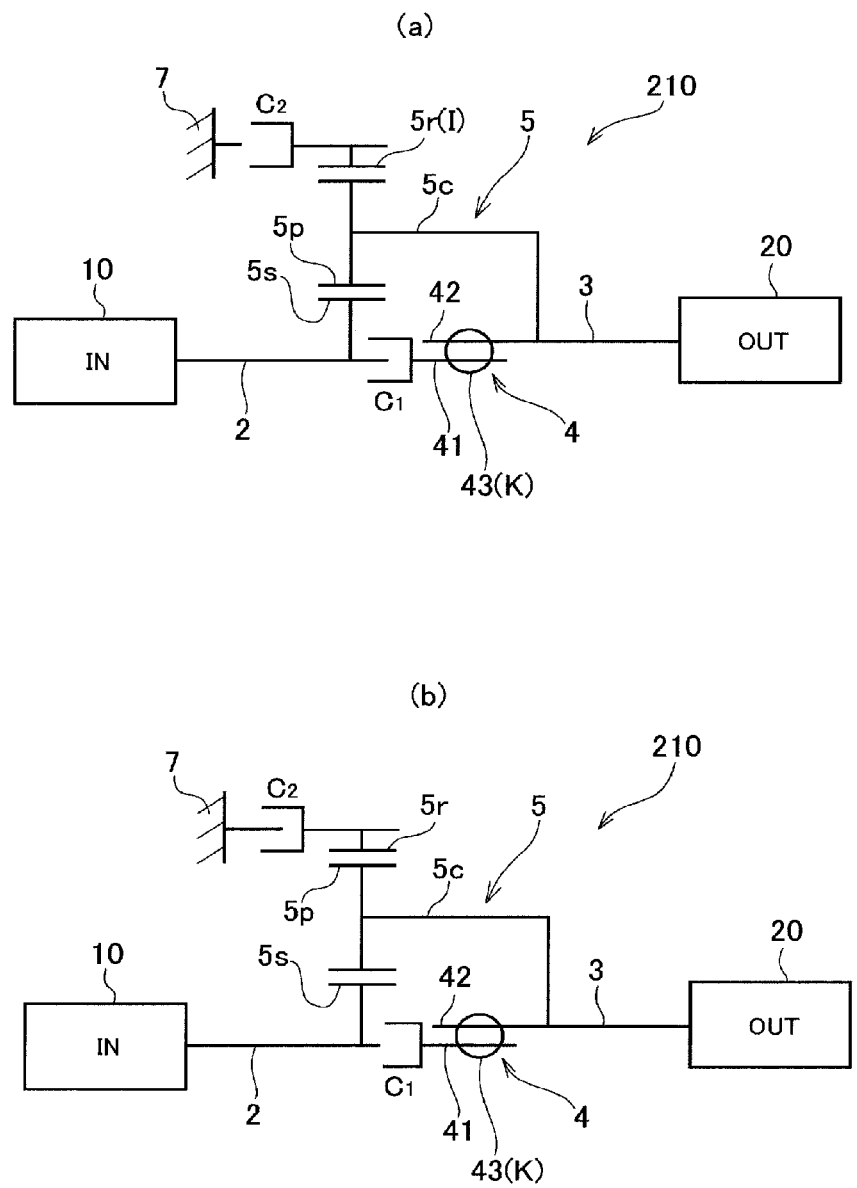
FIG. 16 shows a vibration damper according to a fifth example, where.

Firstly, the vibration damper 210 of the fifth example will be described below by referring to FIG. 16. As shown in FIG. 16a, when the power transmission route is set to the first route R1, the vibration damper 210 makes the ring gear 5r of the planetary mechanism 5 function as the inertial body I. In the planetary mechanism 5 of the vibration damper 210, which includes the ring gear 5r (third rotary element) as the inertial body I, the sun gear 5s (first rotary element) as the input element rotates integrally with the input shaft 2, and the carrier 5c (second rotary element) as the output element rotates integrally with the output shaft 3.

In the vibration damper 210, the ring gear 5r is connected selectively to the fixed portion 7 such as a case by the second clutch C2. The fixed portion 7 is disposed on the engine 10 side of the planetary mechanism 5 in the axial direction. The second clutch C2 functions to fix the ring gear 5r selectively. In the second clutch C2, the engagement element on the fixed side is connected to (integrated with) the fixed portion 7, the engagement element on the rotating side rotates integrally with the ring gear 5r Consequently, the fixed portion 7 corresponds to 'the member to which the torque is applied' in the examples of this invention. Moreover; in the first clutch C1, the engagement element on the input side rotates integrally with the input shaft 2 and the sun gear 5s, and the engagement element on the output side rotates integrally with the input element 41 of the damper mechanism 4. Moreover, as shown in FIG. 16b, when the power transmission route is set to the second route R2, the ring gear 5r is fixed to the fixed portion 7, and serves as the fixed element. Consequently, in the planetary mechanism 5 in the second route R2, the sun gear 5s serves as the input element, the carrier 5c serves as the output element, and the ring gear 5r serves as the fixed element, so that the planetary mechanism 5 functions as the transmission device.

Figure 17:
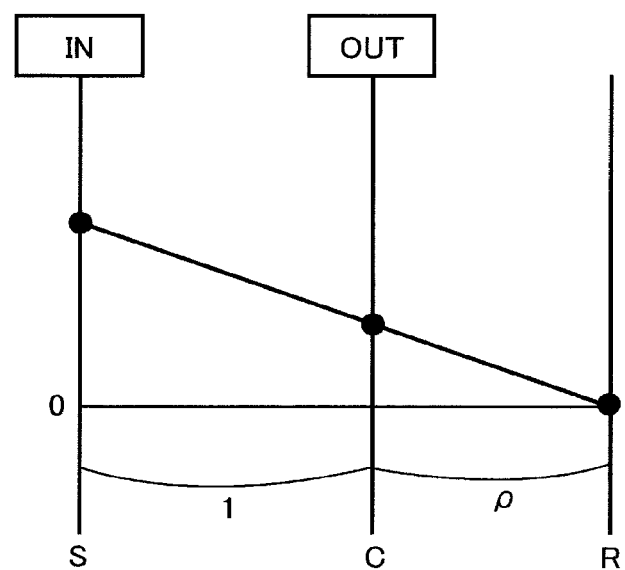
FIG. 17 is a nomographic diagram showing an operating condition of a planetary mechanism which functions as a transmission device when the power transmission route is set to the second route in the fifth example.

FIG. 17 is a nomographic diagram showing an operating condition of the planetary mechanism 5 functioning as a transmission device when the power transmission route is set to the second route R2. As shown in FIG. 17, by fixing the ring gear 5r, the speed of the carrier 5c as the output element becomes lower than that of the sun gear 5s as the input element. In other words, the speed ratio of the planetary mechanism 5 becomes higher than '1', and the planetary mechanism 5 functions as a transmission device. Therefore, in the second route R2 of the second example, the speed ratio γ of the input shaft 2 and the output shaft 2 becomes higher than '1', and the torque from the engine can be amplified by the planetary mechanism 5 and transmitted to the output shaft 3.

As described above, according to the vibration damper of the fifth example, even in a case in which, the rotary element which functions as the inertial body is changed to the ring gear, and the ring gear is fixed selectively, and the locations of the switching mechanism and the damper mechanism are changed, it is possible to achieve an effect similar to that of the second example.

In the abovementioned description of the fifth example, the position at which the fixed portion 7 is provided may be a position where the ring gear 5r can be fixed selectively, and is not limited to the abovementioned position. For example, it is possible to provide the fixed portion 7 on the transmission 20 side of the planetary mechanism 5 in the axial direction.

7. Another Modified Example of First Example

Furthermore, in the abovementioned first example, although the arrangement which includes the inertia mechanism made of a single-pinion planetary mechanism has been described, this invention is not limited to this arrangement, and the inertia mechanism may be formed by a double-pinion planetary mechanism. Consequently, in the double-pinion planetary mechanism, any one of the rotary elements can be made to function as the inertial body. Moreover, the rotary element as the inertial body may be connected to the input shaft 2 or the output shaft 3 selectively by the second clutch C2. Here, in the double-pinion planetary mechanism, a case in which the sun gear is made to function as the inertial body is let to be a sixth example, a case in which the ring gear is made to function as the inertial body is let to be a seventh example, and a case in which the carrier is made to function as the inertial body is let to be an eighth example. A vibration damper of the sixth example will be described by referring to FIG. 18, a vibration damper of the seventh example will be described by referring to FIG. 21, and a vibration damper of the eighth example will be described by referring to FIG. 24. In the description of each modified example, description of arrangements similar as in the first example is omitted, and same reference numerals are used.

7-1. Sixth Example

Figure 18:
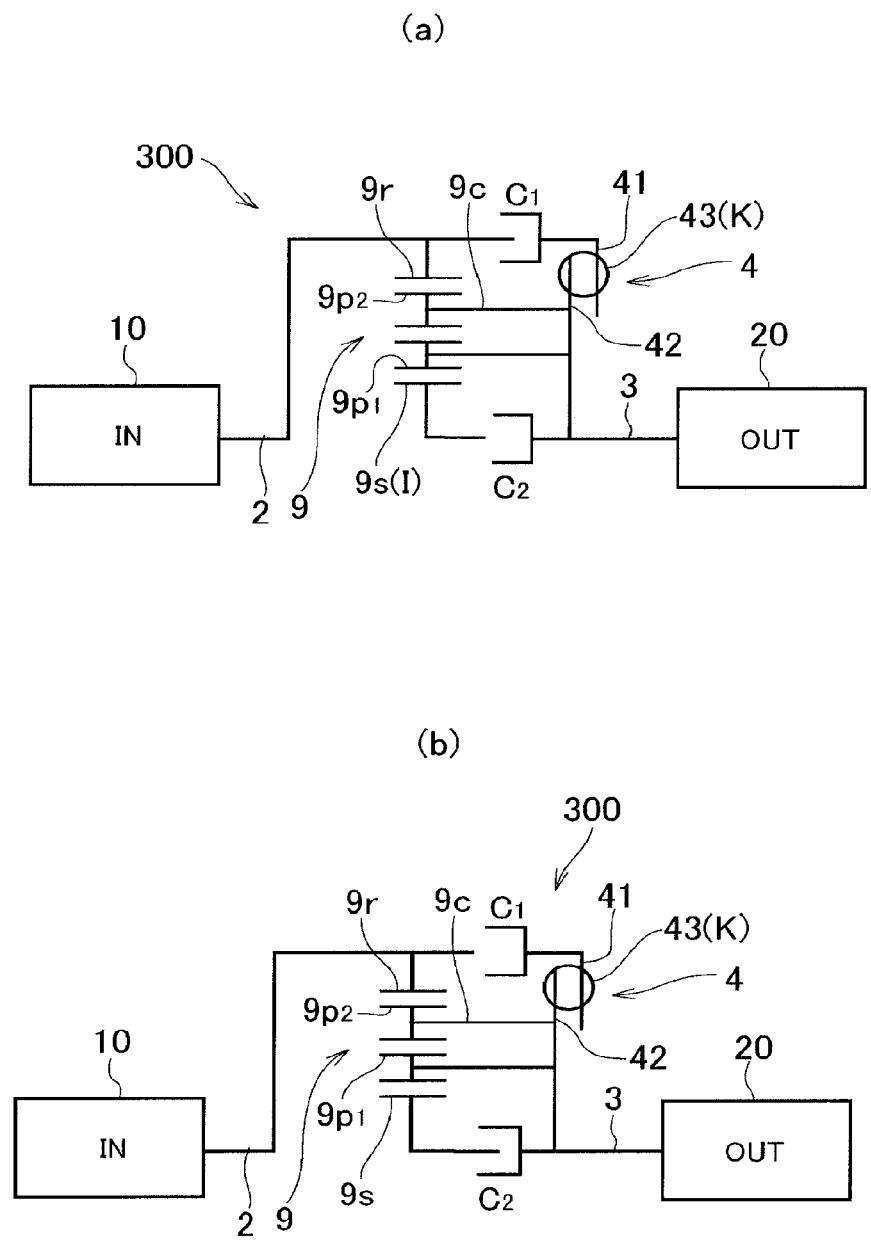
FIG. 18 shows a vibration damper according to a sixth example where.

As shown in FIG. 18, a vibration damper 300 of the sixth example includes a planetary mechanism 9 of a double-pinion type as the inertia mechanism. The planetary mechanism 9 may be a planetary gear mechanism or a planetary roller mechanism for example. The planetary mechanism 9 of the sixth example is formed as a double-pinion planetary gear mechanism which includes three rotary elements namely a sun gear 9s, a carrier 9c, and a ring gear 9r. The sun gear 9s is formed by an external gear. The ring gear 9r is formed by an internal gear and is disposed concentrically with respect to the sun gear 9s. The carrier 9c holds a first pinion gear 9p1 meshed with the sun gear 9s and a second pinion gear 9p2 meshed with the ring gear 9r. In the planetary mechanism 9, each of the pinion gears 9p1 and the 9p2 is held rotatably and revolvably by the carrier 9c.

As shown in FIG. 18a, the vibration damper 300, makes the sun gear 9s of the planetary mechanism 9 function as the inertial body I by engaging the first clutch C1 and disengaging the second clutch C2 and setting the power transmission route to the first route R1. In the planetary mechanism 9 of the vibration damper 300, the sun gear 9s (third rotary element) as the inertial body I is provided, the ring gear 9r (first rotary element) as the input element rotates integrally with the input shaft 2, and the carrier 9c (second rotary element) as the output element rotates integrally with the output shaft 3. The second clutch C2 connects the output shaft 3 or the carrier 9c and the sun gear 9s selectively. Consequently, the output shaft 3 or the carrier 9c corresponds to 'the member to which the torque is applied' in the examples of this invention. In the first clutch C2, the engagement element on the input side rotates integrally with the sun gear 9s, and the engagement element on the output side rotates integrally with the output shaft 3, the carrier 9c, and the output element 42 of the damper mechanism 4. Moreover, in the first clutch C1, the engagement element on the input side rotates integrally with the input shaft 2 and the ring gear 9; and the engagement element on the output side rotates integrally with the input element 41 of the damper mechanism 4. Moreover, as shown in FIG. 18b, when the power transmission route is set to the second route R2, the sun gear 9s rotates integrally with the ring gear 9r which is the input element and the carrier 9c which is the output element.

Figure 19:
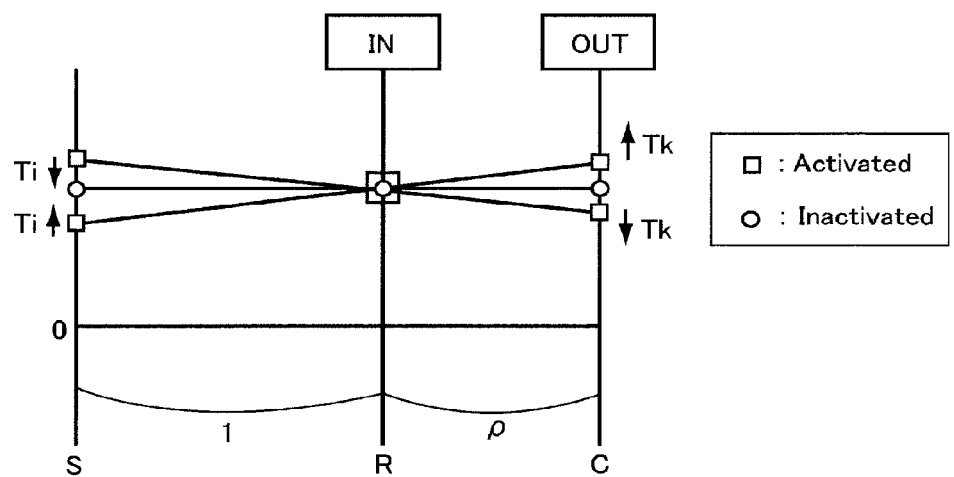
FIG. 19 is a nomographic diagram showing an operating condition of a planetary mechanism which functions as an inertia mechanism when the power transmission route is set to the first route in the sixth example.

Moreover, when the power transmission route is set to the first route R1 in the sixth example, the planetary mechanism 9 in the vibration damper 300 assumes an operating condition shown in a nomographic diagram in FIG. 19. In the nomographic diagram shown in FIG. 19, the sun gear 9s, the ring gear 9r; and the carrier 9c which are the rotary elements of the planetary mechanism 9 are indicated by vertical lines, and distances between these rotary elements are let to be distances corresponding to a gear ratio ρ of the planetary mechanism 9. In FIG. 19, each rotary element of the planetary mechanism 9 is denoted by a symbol, where, S denotes the sun gear 9s, R denotes the ring gear 9r, and C denotes the carrier 9c. Furthermore, square marks shown in FIG. 19 indicate a state in which the damper torque Tk and the inertial torque Ti are generated, and circle marks indicate a state in which the damper torque Tk and the inertial torque Ti are not generated.

As shown in FIG. 19, by the damper torque Tk in the forward direction being generated in the damper mechanism 4, the damper torque Tk acts on the carrier 9c (output shaft 3), and the inertial torque Ti in the forward direction caused due to the damper torque Tk is generated in the sun gear 9s. Whereas, when the damper torque Tk in the counter direction is generated in the damper mechanism 4, the inertial torque Ti in the counter direction is generated in the sun gear 9s. Furthermore, the number of rotations (rotational speed)

of the sun gear 9s changes to the direction of damper torque Tk, and the sun gear 5s rotates relatively with respect to the output shaft 3 (carrier 9c) by the sun gear 9s being in a freely-rotatable state. In other words, the sun gear 9s is co-rotated by the output shaft 3 while generating the inertial torque Ti in the same direction as the damper torque Tk corresponding to the angular acceleration difference Δα between the output shaft 3 and the crank shaft (input shaft 2) of the engine 10. Since the inertial torque Ti acts on the output shaft 3 as a reaction force when the damper torque Tk acts on the sun gear 9s, the direction of the inertial torque Ti acting on the output shaft 3 is a direction opposite to the damper torque Tk. In other words, in the vibration damper 1, when the damper mechanism 4 is operated, the planetary mechanism 9 functions as the inertia mechanism, and the sun gear 9s functions as the inertial body due to the damper torque Tk. Even in the sixth example, an effect similar to the damping effect S described above by referring to FIG. 4 is exerted.

As described above, according to the vibration damper of the sixth example, even in a case in which the planetary mechanism as the inertia mechanism is let to be of double-pinion type, it is possible to achieve an effect similar to that of the first example.

Figure 20:
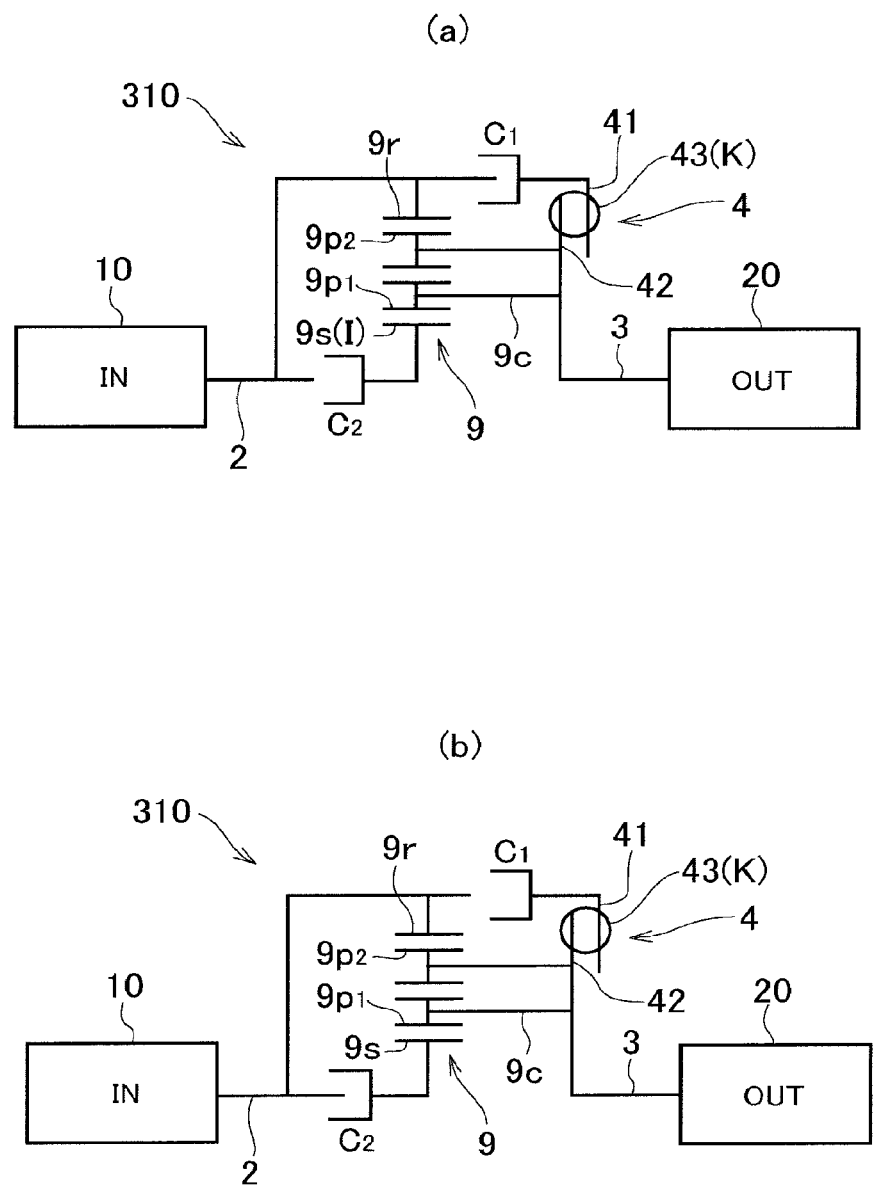
FIG. 20 shows a vibration damper in which a sun gear is connected selectively to an input shaft, as a modified example of the sixth example, where.

Even in the case in which the planetary mechanism is of double-pinion type as in the abovementioned sixth example, since all the rotary elements in the planetary mechanism rotate integrally by engaging the first clutch, the rotary element which functions as the inertial body may be connected to any one of the input shaft or the output shaft. Therefore, as a modified example of the sixth example, as a vibration damper 310 shown in FIG. 20, the vibration damper may include a second clutch C2 which connects the sun gear 9s as the inertial body I to the input shaft 2. The second clutch C2 shown in FIG. 20 connects the sun gear 9s selectively to the input shaft 2. In the second clutch C2, the engagement element on the input side rotates integrally with the input shaft 2, the ring gear 9r, and the engagement element on the input side in the first clutch C1, and the engagement element on the output side rotates integrally with the sun gear 9s. Moreover, the vibration damper 310, when the power transmission route is set to the first route R1 shown in FIG. 20a, and when the power transmission route is set to the second route R2 shown in FIG. 20b, functions similarly as in the abovementioned sixth example.

7-2. Seventh Example

Figure 21:
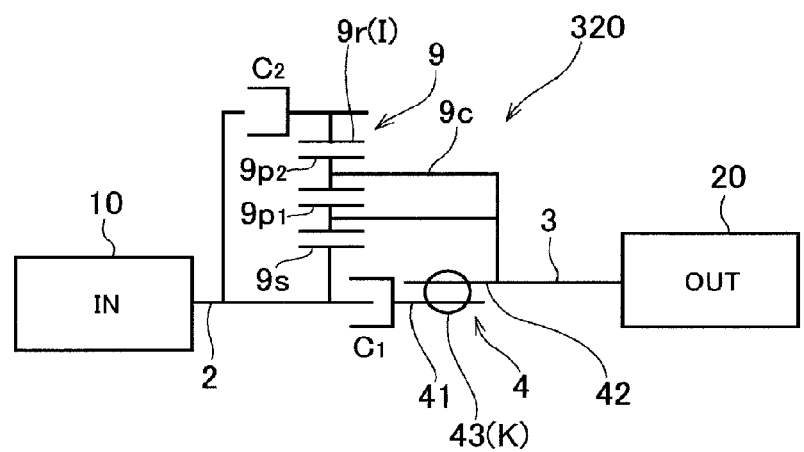
FIG. 21 shows a vibration damper according to a seventh example, where.
Figure 21:
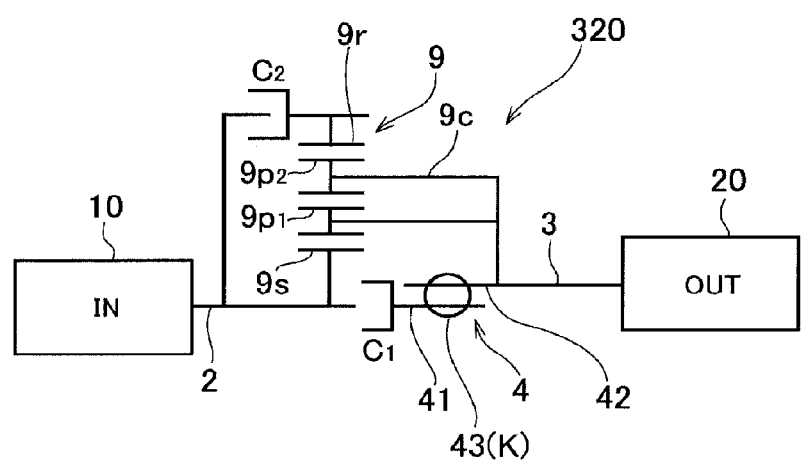

As shown in FIG. 21, a vibration damper 320 of the seventh example is a modified example of the abovementioned sixth example, and particularly, a modified example in which the planetary mechanism of the abovementioned third example is of double-pinion type. In the description of the seventh example, description of arrangements similar as in the sixth example is omitted, and same reference numerals are used.

As shown in FIG. 21a, when the power transmission route is set to the first route R1, in the planetary mechanism 9, the ring gear 9r (third rotary element) functions as the inertial body I, the sun gear 9s (first rotary element) rotates integrally with the input shaft 2, and the carrier 9c (second rotary element) rotates integrally with the output shaft 3. The second clutch C2 of the seventh example connects the ring gear 9r as the inertial body I to the input shaft 2 or the sun gear 9s selectively. Consequently, the input shaft 2 or the sun gear 9s corresponds to 'the member to which the torque is applied' in the examples of this invention. In the second clutch C2, the engagement element on the input side rotates integrally with the input shaft 2, the sun gear 9s, and the engagement element on the input side in the first clutch 1, and the engagement element on the output side rotates integrally with the ring gear 9r. Moreover in the first clutch C1, the engagement element on the input side rotates integrally with input shaft 2, the sun gear 9s, and the engagement element on the input side in the second clutch C2, and the engagement element on the output side rotates integrally with the input element 41 of the damper mechanism 4. Moreover as shown in FIG. 21b, when the power transmission route is set to the second route R2, the ring gear 9r rotates integrally with the sun gear 9s which is the input element and the carrier 9c which is the output element.

Figure 22:
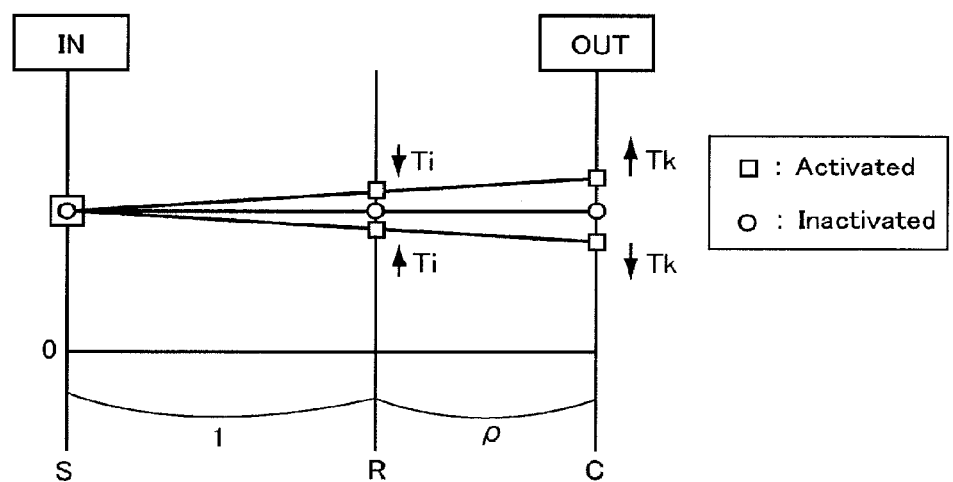
FIG. 22 is a nomographic diagram showing an operating condition of a planetary mechanism which functions as an inertia mechanism when the power transmission route is set to the first route in the seventh example.

Moreover, when the power transmission route is set to the first route R1 in the seventh example, the planetary mechanism 9 in the vibration damper 320 assumes an operating condition shown in a nomographic diagram in FIG. 22. As shown in FIG. 22, by the damper torque Tk in the forward direction being generated in the damper mechanism 4, the damper torque Tk acts on the carrier 9c (output shaft 3), and by allowing the ring gear 9r to rotate freely, the inertial torque Ti in the counter direction caused due to the damper torque Tk is generated in the ring gear 9x Whereas, when the damper torque Tk in the counter direction is generated in the damper mechanism 4, the inertial torque Ti in the forward direction is generated in the ring gear 9r. Furthermore, the number of rotations (rotational speed) of the ring gear 9r changes to the direction of the damper torque Tk, and the ring gear 9r rotates relatively with respect to the output shaft 3 (carrier 9c). In other words, the ring gear 9r is rotated passively by the output shaft 3 while generating the inertial torque Ti in the opposite direction with respect to the damper torque Tk corresponding to the angular acceleration difference Δα between the output shaft 3 and the crank shaft (input shaft 2) of the engine 10. Since the inertial torque Ti acts on the output shaft 3 as a reaction force when the damper torque Tk acts on the ring gear 9z the direction of the inertial torque Ti acting on the output shaft 3 is a direction opposite to the damper torque Tk. In other words, in the vibration damper 320, when the damper mechanism 4 is operated, the planetary mechanism 9 functions as the inertia mechanism and the ring gear 9r functions as inertial body I due to the damper torque Tk. Even in the seventh example, an effect similar to the damping effect S described above by referring to FIG. 4 is exerted.

As described above, according to the vibration damper of the seventh example, even in a case in which the planetary mechanism as the inertia mechanism is let to be of double-pinion type, and the rotary element which functions as the inertial body is changed to the ring gear, and the ring gear is connected to the input shaft selectively, as well as the location of the switching mechanism is changed, it is possible to achieve an effect similar to that of the first example.

Figure 23:
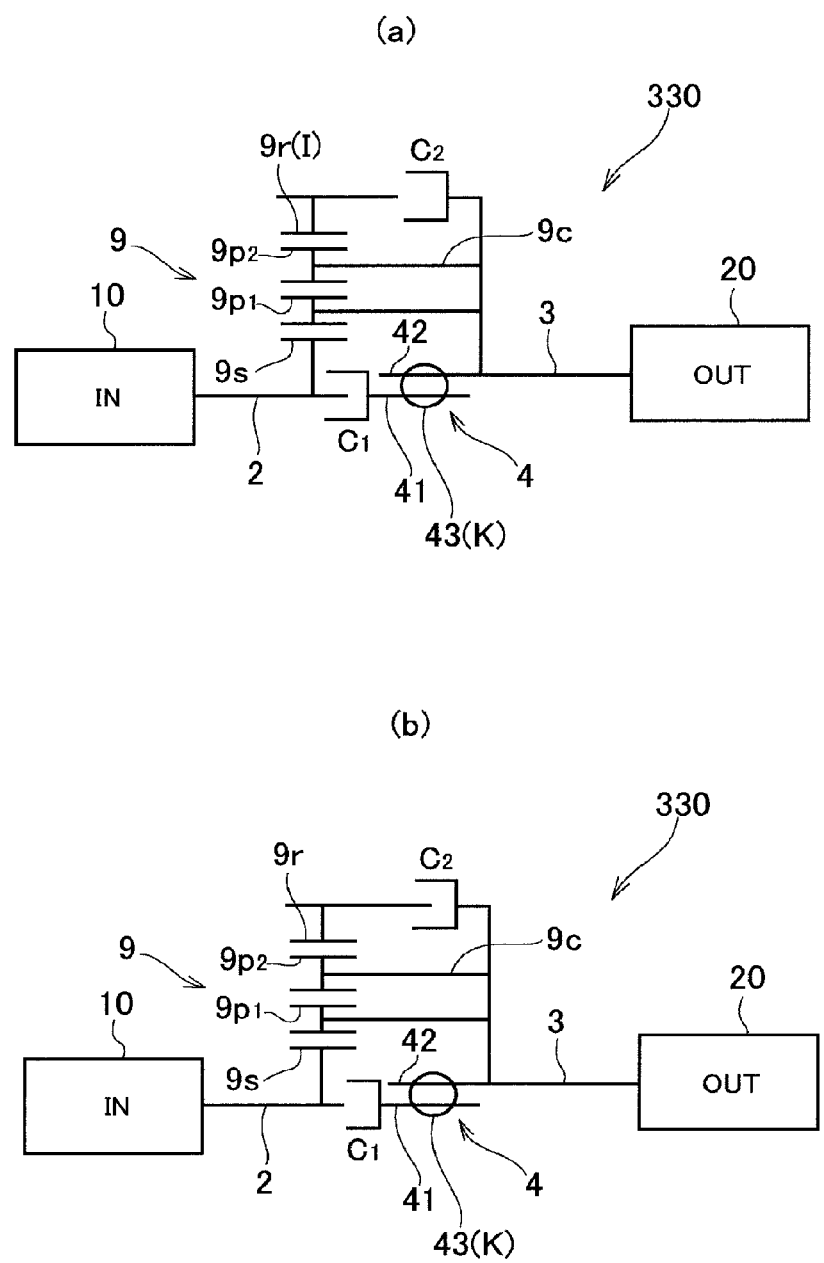
FIG. 23 shows a vibration damper in which a ring gear is connected selectively to an output shaft, as a modified example of the seventh example, where.

As a modified example of the abovementioned seventh example, as a vibration damper 330 shown in FIG. 23, the vibration damper may include a second clutch C2 which connects the ring gear 9r as the inertial body to the output shaft 3. The second clutch C2 shown in FIG. 23 connects the ring gear 9r as the inertial body I to the output shaft 3 or the carrier 9c selectively. Therefore, the output shaft 3 or the carrier 9c corresponds to 'the member to which the torque is applied' in the examples of this invention. In the second clutch C2, the engagement element on the input side rotates integrally with the ring gear 9r, and the engagement element on the output side rotates integrally with the output shaft 3, the carrier 9c, and the output element 42 of the damper mechanism 4. Moreover, the vibration damper 330, when the power transmission route is set to the first route R1 shown in FIG. 23a, and when the power transmission route is set to the second route R2 shown in FIG. 23b, functions similarly as in the abovementioned seventh example.

7-3. Eighth Example

Figure 24:
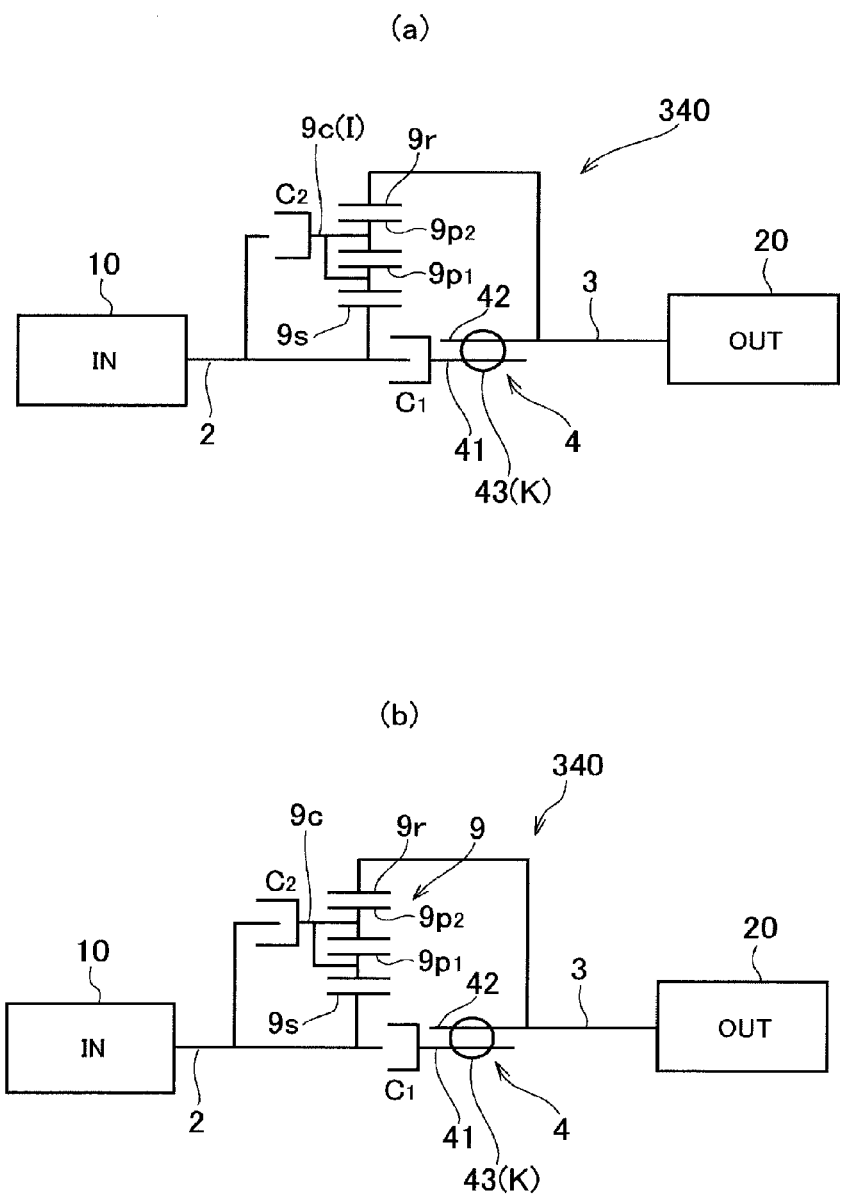
FIG. 24 shows a vibration damper according to an eighth example, where.

As shown in FIG. 24, a vibration damper 340 of the eighth example is a modified example of the abovementioned sixth example and seventh example, and particularly, a modified example in which the planetary mechanism of the abovementioned fourth example is of double-pinion type. In the description of the eight example, description of arrangements similar as in the sixth example and the seventh example is omitted, and same reference numerals are used.

As shown in FIG. 24a, when the power transmission route is set to the first route R1, in the planetary mechanism 9 of the vibration damper 340, the carrier 9c (third rotary element) functions as the inertial body I, the sun gear 9s (first rotary element) rotates integrally with the input shaft 2, and the ring gear 9r (second rotary element) rotates integrally with the output shaft 3. The second clutch C2 of the eighth example connects the carrier 9c as the inertial body I to the input shaft 2 or the sun gear 9s selectively. Consequently, the input shaft 2 or the sun gear 9s corresponds to 'the member to which the torque is applied' in the examples of this invention. In the second clutch C2, the engagement element on the output side rotates integrally with the carrier 9c. Moreover, in the damper mechanism 4 of the eighth example, the output element 42 rotates integrally with the ring gear 9r and the output shaft 3. Furthermore, as shown in FIG. 24b, when the power transmission route is set to the second route R2, the carrier 9c rotates integrally with the sun gear 9s which is the input element and the ring gear 9r which is the output element.

Figure 25:
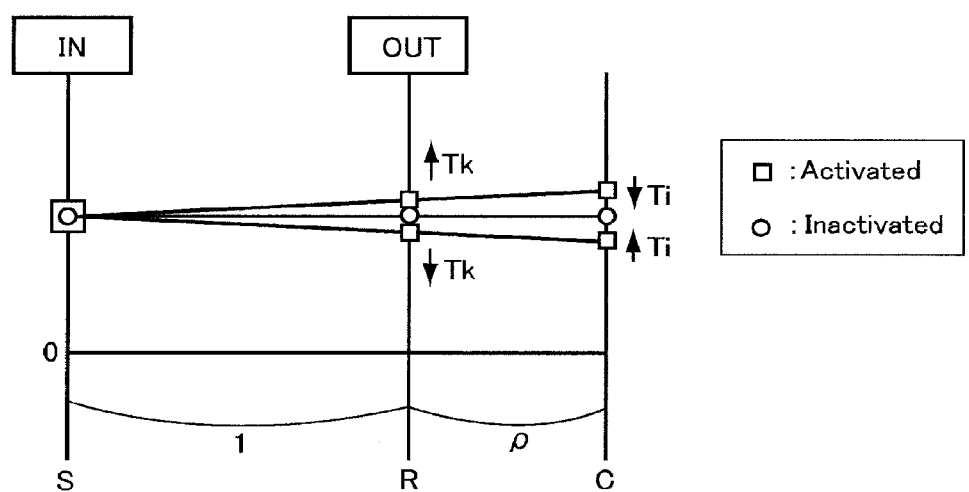
FIG. 25 is a nomographic diagram showing an operating condition of a planetary mechanism which functions as an inertia mechanism when the route is set to the first route in the eighth example.
Figure 26:
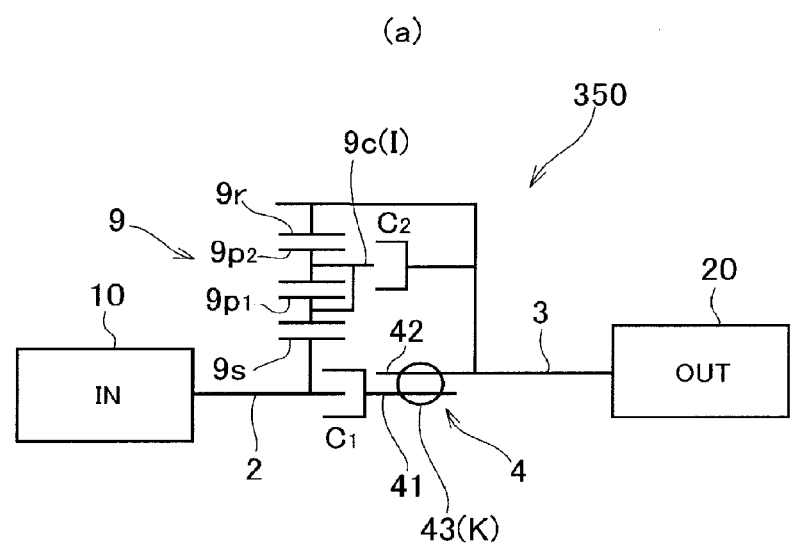
FIG. 26 shows a vibration damper in which a carrier is connected selectively to an output shaft as a modified example of the eighth example, where.
Figure 26:
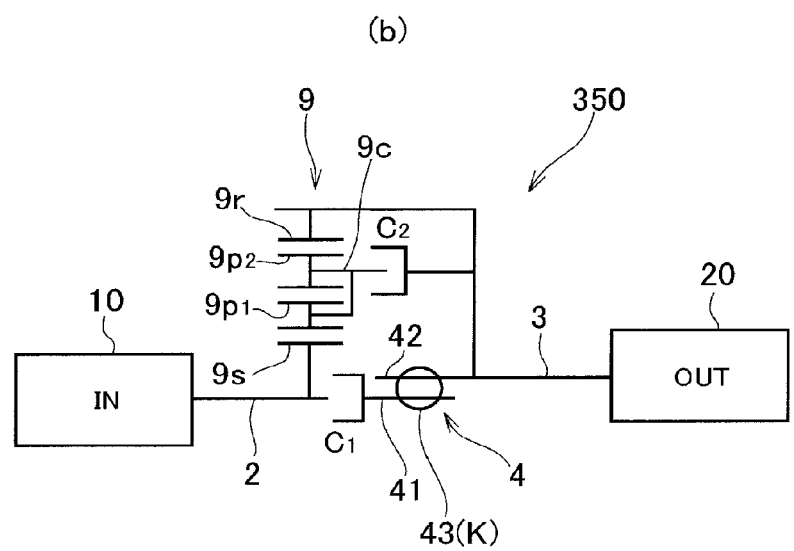

Moreover, when the power transmission route is set to the first route R1 in the eighth example, the planetary mechanism 9 in the vibration damper 340 assumes an operating conditional shown in a nomographic diagram in FIG. 25. As shown in FIG. 25, by the damper torque Tk in the forward direction being generated in the damper mechanism 4, the damper torque Tk acts on the ring gear 9r (output shaft 3), and by the carrier 9c being in a freely-rotatable state, the inertial torque Ti in the counter direction caused due to the damper torque Tk is generated in the carrier 9c. Whereas, when the damper torque Tk in the counter direction is generated in the damper mechanism 4, the inertial torque Ti in the forward direction is generated in the carrier 9c. Furthermore, the number of rotations (rotational speed) of the carrier 9c changes to the direction of the damper torque Tk, and the carrier 9c rotates relatively with respect to the output shaft 3 (ring gear 9r). In other words, the carrier 9c is co-rotated by the output shaft 3 while generating the inertial torque Ti in the opposite direction with respect to the damper torque Tk corresponding to the angular acceleration difference Δα between the output shaft 3 and the crank shaft (input shaft 2) of the engine 10. Since the inertial torque Ti acts on the output shaft 3 as a reaction force when the damper torque Tk acts on the carrier 9c, the direction of the inertial torque Ti acting on the output shaft 3 is a direction opposite to the damper torque Tk. In other words, in the vibration damper 340, when the damper mechanism 4 is operated, the planetary mechanism 9 functions as the inertia mechanism, and the carrier 9c functions as the inertial body I due to the damper torque Tk. Even in the eighth example, an effect similar to the damping effect S described above by referring to FIG. 4 is exerted.

As described above, according to the vibration damper of the eighth example, even in a case in which the planetary mechanism as the inertia mechanism is let to be of double-pinion type, and the rotary element which functions as the inertial body is changed to the carrier; moreover the carrier is connected to the input shaft selectively, as well as the location of the switching mechanism is changed, it is possible to achieve an effect similar to that of the first example.

As a modified example of the abovementioned eighth example, as a vibration damper 350 shown in FIG. 25, the vibration damper may include a second clutch C2 which connects the carrier 9c as the inertial body I to the output shaft 3. The second clutch C2 shown in FIG. 25 connects the carrier 9c as the inertial body to the output shaft 3 or the ring gear 9r selectively. Therefore, the output shaft 3 or the ring gear 9r corresponds to 'the member to which the torque is applied' in the examples of this invention. In the second clutch C2, the engagement element on the input side rotates integrally with the carrier 9c, and the engagement element on the output side rotates integrally with the output shaft 3, the ring gear 9r and the output element 42 of the damper mechanism 4. Moreover, the vibration damper 350, when the power transmission route is set to the first route R1 shown in FIG. 25a, and when the power transmission route is set to the second route R2 shown in FIG. 25b, functions similarly as in the abovementioned eighth example.

8. Another Modified Example of Second Example

Figure 27:
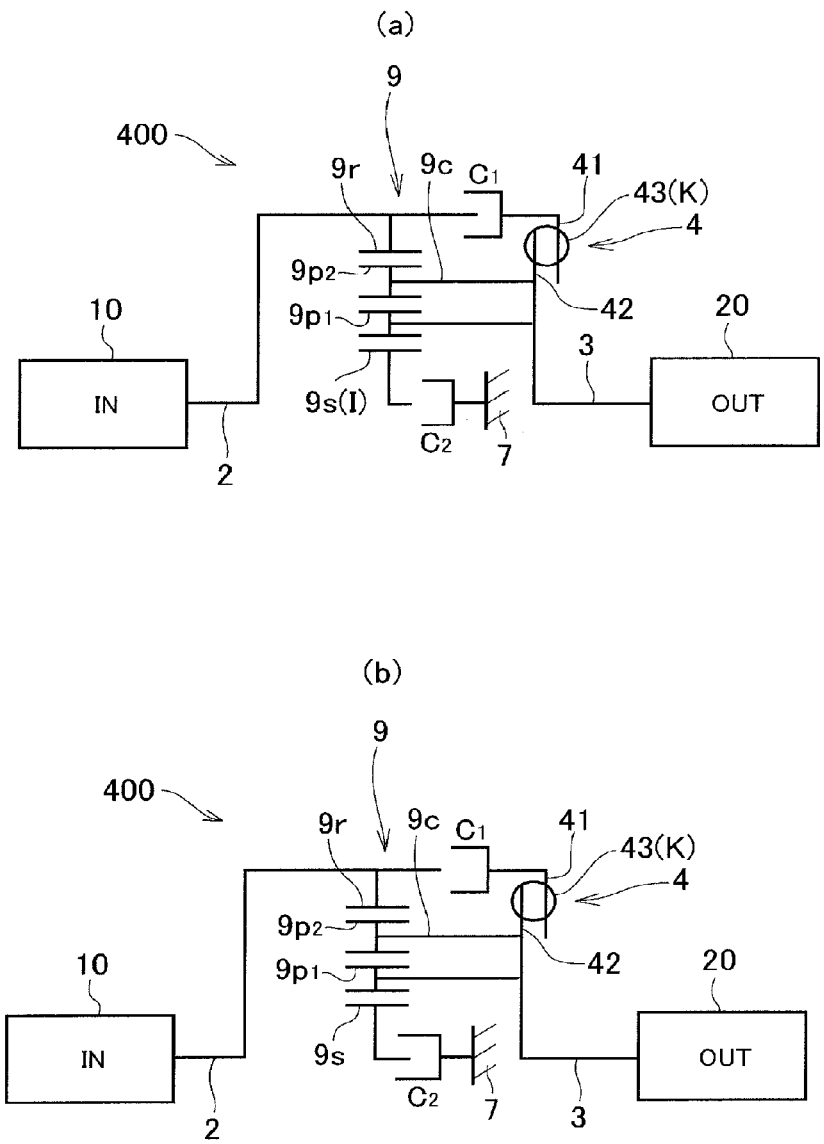
FIG. 27 shows a vibration damper according to a ninth example, where.

Moreover, in the abovementioned second example, the inertia mechanism which functions as a transmission device may be formed of a double-pinion planetary mechanism. Here, in the double-pinion planetary mechanism, a case in which the sun gear is made to function as the inertial body is let to be a ninth example, and a case in which the carrier is made to function as the inertial body is let to be a tenth example. A vibration damper of the ninth example will be described by referring to FIG. 27, and a vibration damper of the ninth example will be described by referring to FIG. 29. In the description of each modified example, description of arrangements similar as in the second example and the sixth example is omitted, and same reference numerals are used.

8-1. Ninth Example

As shown in FIG. 27a, a vibration damper 400 of the ninth example makes the sun gear 9s of the planetary mechanism 9 function as the inertial body I by engaging the first clutch C1 and disengaging the second clutch C2 and setting the power transmission route to the first route R1. The second clutch C2 connects the sun gear 9s selectively to the fixed portion 7 such as a case. Therefore, the fixed portion 7 corresponds to 'the member to which the torque is applied' in the examples of this invention. In the second clutch C2, the engagement element on the fixed side is connected to (integrated with) the fixed portion 7, and the engagement element on the rotating side rotates integrally with the sun gear 9s. The fixed portion 7 is disposed on the transmission 20 side of the planetary mechanism 9 in the axial direction. Moreover, as shown in FIG. 27b, the vibration damper 400 fixes the sun gear 9s to the fixed portion 7 by setting the power transmission route to the second route R2 by disengaging the first clutch C1 and engaging the second clutch C2. The second clutch R2 connects the sun gear 9s to the fixed portion 7. Consequently, in the planetary mechanism 9 in the second route R2, the sun gear 9s (third rotary element) serves as the fixed element, the ring gear 9r (first rotary element) serves as the input element, and the carrier 9c (second rotary element) serves as the output element, so that the planetary mechanism 9 functions as the transmission device.

Figure 28:
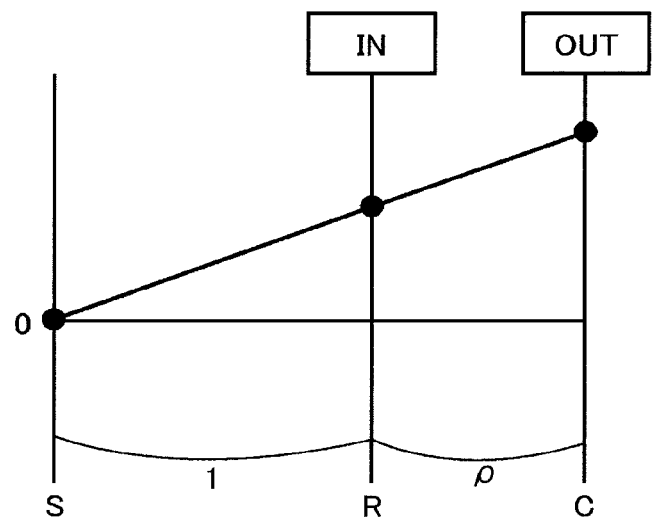
FIG. 28 is a nomographic diagram showing an operating condition of a planetary mechanism which functions as a transmission device when the power transmission route is set to the second route in the ninth example.

FIG. 28 is a nomographic diagram showing an operating condition of the planetary mechanism 9 functioning as a transmission device when the power transmission route is set to the second route R2. As shown in FIG. 28, by fixing the sun gear 9s, the speed of the carrier 9c as the output element becomes higher than that of the ring gear 9r as the input element. In other words, the speed ratio of the planetary mechanism 9 becomes smaller than '1', and the planetary mechanism 9 functions as a speed-increasing device. Therefore, in the second route R2 of the ninth example, the speed ratio γ of the input shaft 2 and the output shaft 3 becomes smaller than '1', and the power from the engine 10 can be transmitted to the output shaft 3 while increasing the speed by the planetary mechanism 9.

As described above, according to the vibration damper of the ninth example, even when the planetary mechanism as the inertia mechanism is formed of a double-pinion type, it is possible to achieve an effect similar to that of the second example, and to make the planetary mechanism function as the speed-increasing device.

In the abovementioned description of the ninth example, the position at which the fixed portion 7 is to be provided is not limited to the abovementioned position, provided that it is a position at which the sun gear 9s can be fixed selectively. For instance, it is also possible to provide the fixed member 7 on the engine 10 side of the planetary mechanism 9 in the axial direction.

8-2. Tenth Example

Figure 29:
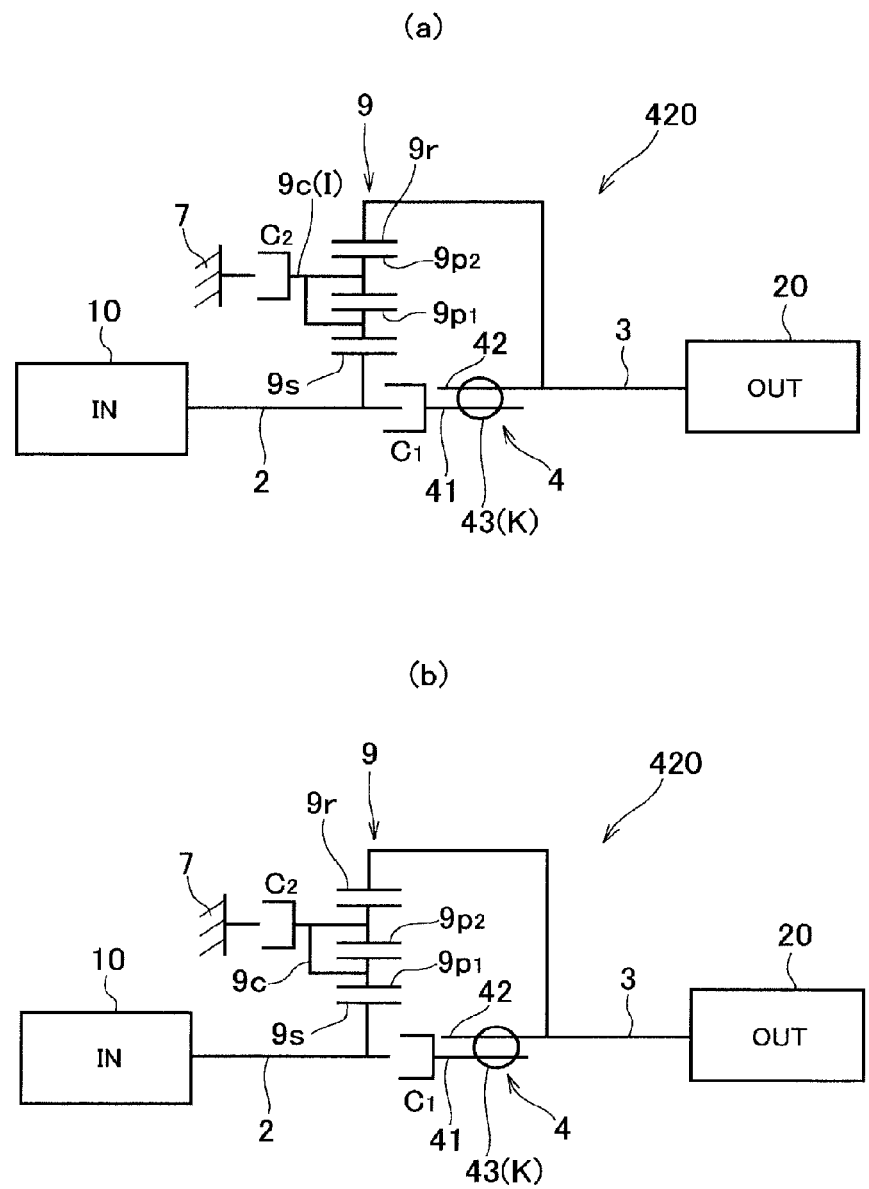
FIG. 29 shows a vibration damper according to a tenth example, where.

As shown in FIG. 29, a vibration damper 420 of the tenth example is a modified example of the abovementioned ninth example. In the description of the tenth example, description of arrangements similar as in the ninth example is omitted, and same reference numerals are used.

As shown in FIG. 29a, the vibration damper 420 makes the carrier 9c of the planetary mechanism 9 function as the inertial body I by setting the power transmission route to the first route R1 by engaging the first clutch C1 and disengaging the second clutch C2. In the planetary mechanism 9 of the vibration damper 420, the carrier 9c (third rotary element) serves as the inertial body I, the sun gear 9s (first rotary element) as the input element rotates integrally with the input shaft 2, and the ring gear 9r (second rotary element) as the output element rotates integrally with the output shaft 3. The second clutch C2 connects the carrier 9c selectively to the fixed portion 7 such as a case. Therefore, the fixed portion 7 corresponds to 'the member to which the torque is applied' in the examples of this invention. In the second clutch C2, the engagement element on the fixed side is connected to (integrated with) the fixed portion 7, and the engagement element on the rotating side rotates integrally with the carrier 9c. Moreover, in the damper mechanism 4 of the tenth example, the output element 42 rotates integrally with the ring gear 9r and the output shaft 3. Moreover, as shown in FIG. 29b, when the power transmission route is set to the second route R2, the carrier 9c is fixed to the fixed portion 7, and serves as the fixed element. Consequently, in the planetary mechanism 9 in the second route R2, the sun gear 9s serves as the input element, the ring gear 9r serves as the output element, and the carrier 9c serves as the fixed element, so that the planetary mechanism 9 function as the transmission device.

Figure 30:
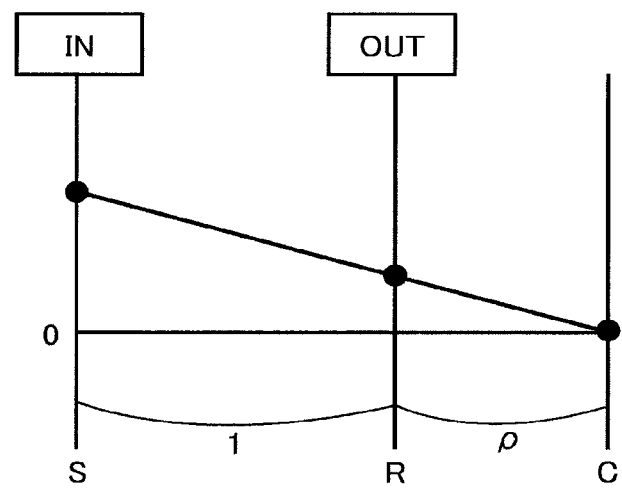
FIG. 30 is a nomographic diagram showing an operating condition of a planetary mechanism which functions as a transmission device when the power transmission route is set to the second route in the tenth example.

FIG. 30 is a nomographic diagram showing an operating condition of the planetary mechanism 9 functioning as a transmission device when the power transmission route is set to the second route R2. As shown in FIG. 30, by fixing the carrier 9c, the speed of the ring gear as the output element becomes lower than that of the sun gear 9s. In other words, the speed ratio of the planetary mechanism 9 becomes larger than '1', and the planetary mechanism 9 functions as a speed reducing device. Therefore, in the second route R2 of the tenth example, the speed ratio γ of the input shaft 2 and the output shaft 3 becomes larger than '1', and the torque from the engine 10 can be transmitted to the output shaft 3 while being amplified by the planetary mechanism 9.

As described above, according to the vibration damper of the tenth example, even in a case in which the planetary mechanism as the inertia mechanism is formed of a double-pinion type, the rotary element which functions as the inertial body is changed to the carrier, and the carrier is fixed selectively, as well as the locations of the switching mechanism and the damper mechanism are changed, it is possible to achieve an effect similar to that of the second example.

In the abovementioned tenth example, the position at which the fixed portion 7 is to be provided is not limited to the abovementioned position, and may be a position where the ring gear 9r can be fixed selectively. For instance, it is possible to provide the fixed portion 7 on the transmission 20 side of the planetary mechanism 9 in the axial direction.

Moreover, in the vibration damper of each of the abovementioned examples, although an arrangement in which a coil spring serves as an elastic member has been described, the present invention is not limited to this arrangement, and a shock-absorbing member made of a resin for example, may be used as the elastic member instead of the abovementioned coil spring.

In the each of the abovementioned examples, in a case in which the first clutch is engaged and the second clutch is engaged, since the rotary elements of the planetary mechanism rotate integrally, it is possible to couple the engine directly to the transmission, and to improve the response of the vehicle. In this case, the damping effect by the vibration damper is not exerted.

The invention claimed is:

1. A vibration damper which includes a damper mechanism having an elastic member that is expanded and compressed by a pulsation of a torque transmitted between an input shaft to which the torque is inputted and an output shaft, and an inertial body that is allowed to be rotated freely by the pulsation of the torque and that generates an inertial torque in a direction of suppressing the pulsation of torque when a rotational speed is changed, comprising:
   a first route which transmits the torque between the input shaft and the output shaft via the damper mechanism;
   a second route which transmits the torque between the input shaft and the output shaft while bypassing the damper mechanism; and
   a switching mechanism which switches a torque transmission route between the input shaft and the output shaft to any one of the first route and the second route,
   wherein the switching mechanism allows the inertial body to rotate freely in a case that the torque transmitting route between the input shaft and the output shaft is switched to the first route, and connects the inertial member to a member to which a torque is applied in a case that the torque transmitting route between the input shaft and the output shaft is switched to the second route so as to transmit the torque through the second route.

2. The vibration damper according to claim 1, further comprising:
a planetary mechanism adapted to perform a differential action among a plurality of rotary elements, wherein
the planetary mechanism comprises a first rotary element to which the torque is transmitted from the input shaft, a second rotary element which is rotated integrally with the output shaft, and a third rotary element which serves as the inertial body,
the damper mechanism is disposed between the first rotary element and the second rotary element to transmit the torque therebetween, and
the switching mechanism comprises a first clutch mechanism which is disposed in series with respect to the damper mechanism between the first rotary element and the second rotary element, and a second clutch mechanism which connects the third rotary element to one of the first rotary element and the second rotary element.

3. The vibration damper according to claim 1, further comprising:
a planetary mechanism adapted to perform a differential action among a plurality of rotary elements, wherein
the planetary mechanism comprises a first rotary element to which the torque is transmitted from the input shaft, a second rotary element which rotates integrally with the output shaft, and a third rotary element which serves as the inertial body,
the member to which the torque is applied includes a fixed portion to which the torque is applied from the third rotary element to exert a reaction torque to the third rotary element, and
the switching mechanism comprises a first clutch mechanism which is disposed in series with respect to the damper mechanism between the first rotary element and the second rotary element, and a second clutch mechanism which connects the third rotary element to one of the first rotary element and the second rotary element.

4. The vibration damper according to claim 1, further comprising:
a spring damper mechanism which is disposed between an engine and the input shaft, or on the output shaft; and
a controller which carries out a switching operation of the switching mechanism,
wherein the controller is configured to
compare a speed of the engine with a predetermined criterion speed, and
switch the switching mechanism to transmit the torque from the input shaft to the output shaft through the first route in a case that the speed of the engine is lower than the predetermined speed.

5. The vibration damper according to claim 4, wherein the controller is further configured to switch the switching mechanism to transmit the torque from the input shaft to the output shaft through the second route in a case that the speed of the engine is equal to or higher than the predetermined speed.

6. The vibration damper according to claim 1, further comprising:
a spring damper mechanism which is disposed between an engine and the input shaft or on the output shaft; and
a controller which carries out a switching operation of the switching mechanism,
wherein the controller is configured to
compare a speed of the engine with a predetermined criterion speed, and
switch the switching mechanism to transmit the torque from the input shaft to the output shaft through the second route in a case that the speed of the engine is equal to or higher than the predetermined speed.

7. The vibration damper according to claim 2, further comprising:
a spring damper mechanism which is disposed between an engine and the input shaft, or on the output shaft; and
a controller which carries out a switching operation of the switching mechanism,
wherein the controller is configured to
compare a speed of the engine with a predetermined criterion speed, and
switch the switching mechanism to transmit the torque from the input shaft to the output shaft through the first route in a case that the speed of the engine is lower than the predetermined speed.

8. The vibration damper according to claim 3, further comprising:
a spring damper mechanism which is disposed between an engine and the input shaft, or on the output shaft; and
a controller which carries out a switching operation of the switching mechanism,
wherein the controller is configured to
compare a speed of the engine with a predetermined criterion speed, and
switch the switching mechanism to transmit the torque from the input shaft to the output shaft through the first route in a case that the speed of the engine is lower than the predetermined speed.

9. The vibration damper according to claim 7, wherein the controller is further configured to switch the switching mechanism to transmit the torque from the input shaft to the output shaft through the second route in a case that the speed of the engine is equal to or higher than the predetermined speed.

10. The vibration damper according to claim 8, wherein the controller is further configured to switch the switching mechanism to transmit the torque from the input shaft to the output shaft through the second route in a case that the speed of the engine is equal to or higher than the predetermined speed.

11. The vibration damper according to claim 2, further comprising:
a spring damper mechanism which is disposed between an engine and the input shaft or on the output shaft; and
a controller which carries out a switching operation of the switching mechanism,
wherein the controller is configured to
compare a speed of the engine with a predetermined criterion speed, and
switch the switching mechanism to transmit the torque from the input shaft to the output shaft through the second route in a case that the speed of the engine is equal to or higher than the predetermined speed.

12. The vibration damper according to claim 3, further comprising:
a spring damper mechanism which is disposed between an engine and the input shaft or on the output shaft; and
a controller which carries out a switching operation of the switching mechanism,
wherein the controller is configured to compare a speed of the engine with a predetermined criterion speed, and switch the switching mechanism to transmit the torque from the input shaft to the output shaft through the second route in a case that the speed of the engine is equal to or higher than the predetermined speed.

\* \* \* \* \*